(12) United States Patent
Doogan et al.

(10) Patent No.: US 12,223,812 B2
(45) Date of Patent: Feb. 11, 2025

(54) METHODS AND SYSTEMS FOR OBJECT TRACKING

(71) Applicant: Comcast Cable Communications, LLC, Philadelphia, PA (US)

(72) Inventors: Melissa Doogan, Philadelphia, PA (US); Robert Lopes, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 444 days.

(21) Appl. No.: 17/350,784

(22) Filed: Jun. 17, 2021

(65) Prior Publication Data

US 2022/0406155 A1 Dec. 22, 2022

(51) Int. Cl.
| | | |
|---|---|---|
| *G08B 13/196* | (2006.01) | |
| *G06F 18/25* | (2023.01) | |
| *G06T 11/60* | (2006.01) | |
| *G06V 20/52* | (2022.01) | |
| *G06V 40/16* | (2022.01) | |
| *H04L 9/32* | (2006.01) | |

(52) U.S. Cl.
CPC ........ *G08B 13/19686* (2013.01); *G06T 11/60* (2013.01); *G06V 20/52* (2022.01); *H04L 9/3236* (2013.01); *G06F 18/251* (2023.01); *G06V 40/172* (2022.01)

(58) Field of Classification Search
CPC .. G08B 13/19686; G06T 11/60; G06V 20/52; G06V 40/172; G06V 10/62; H04L 9/3236; H04L 9/0643; H04L 9/0662; H04L 9/0866; H04L 9/0891; G06F 18/251

See application file for complete search history.

(56) References Cited

U.S. PATENT DOCUMENTS

| | | |
|---|---|---|
| 8,902,227 B2 | 12/2014 | Harrison |
| 2018/0350144 A1 | 12/2018 | Rathod |

*Primary Examiner* — Edward F Urban
*Assistant Examiner* — Wassim Mahrouka
(74) *Attorney, Agent, or Firm* — Ballard Spahr LLP

(57) ABSTRACT

Methods, systems, and apparatus are described herein for tracking objects and managing data. One or more objects may be determined in a first image. An avatar may be generated which is associated with the one or more objects in the first image. A second image may be received. The second image may comprise a change in at least one object of the one or more objects. Based on the change, in the at least one object, the avatar may be updated and the information kept for a predetermined period of time.

37 Claims, 9 Drawing Sheets

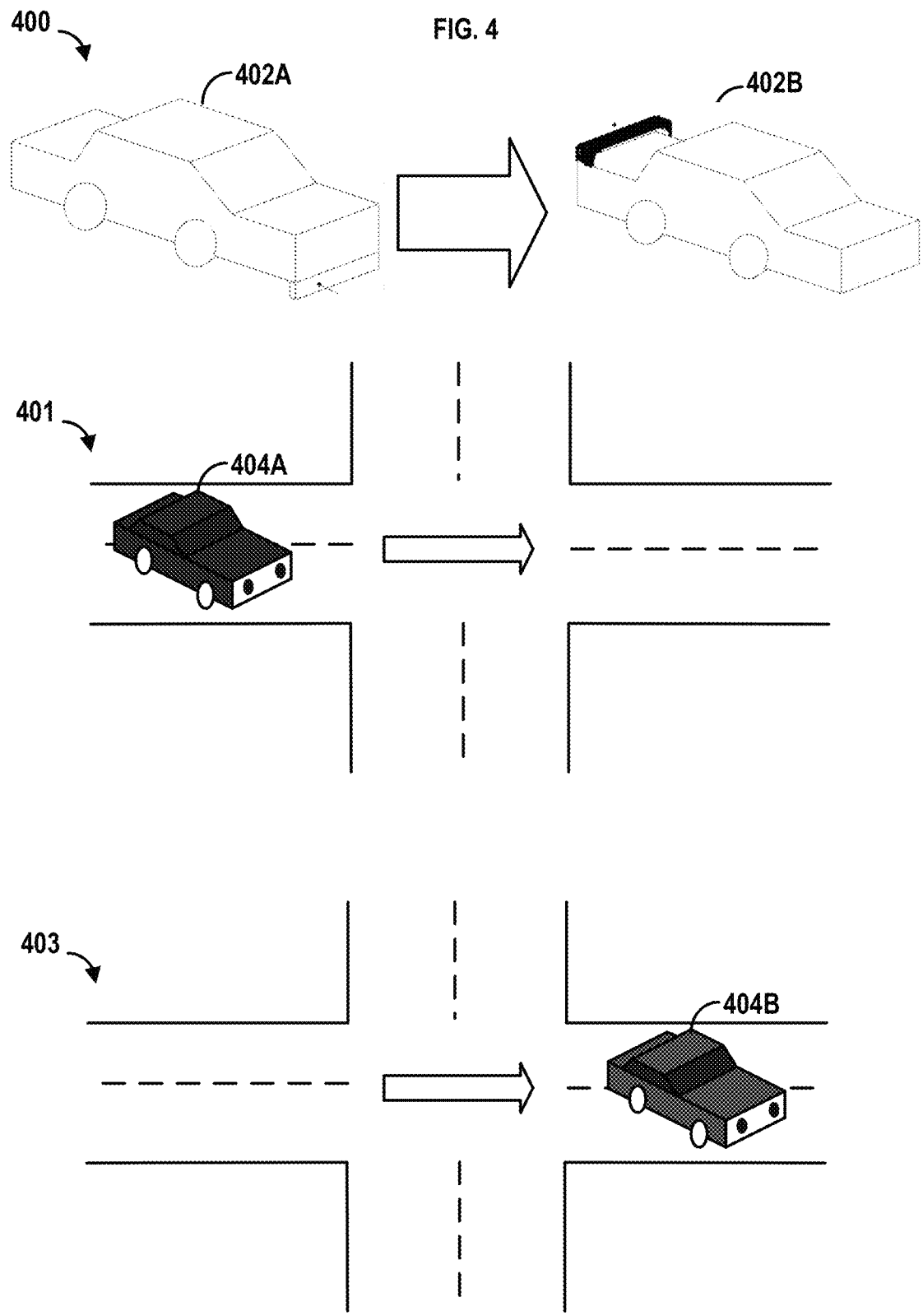

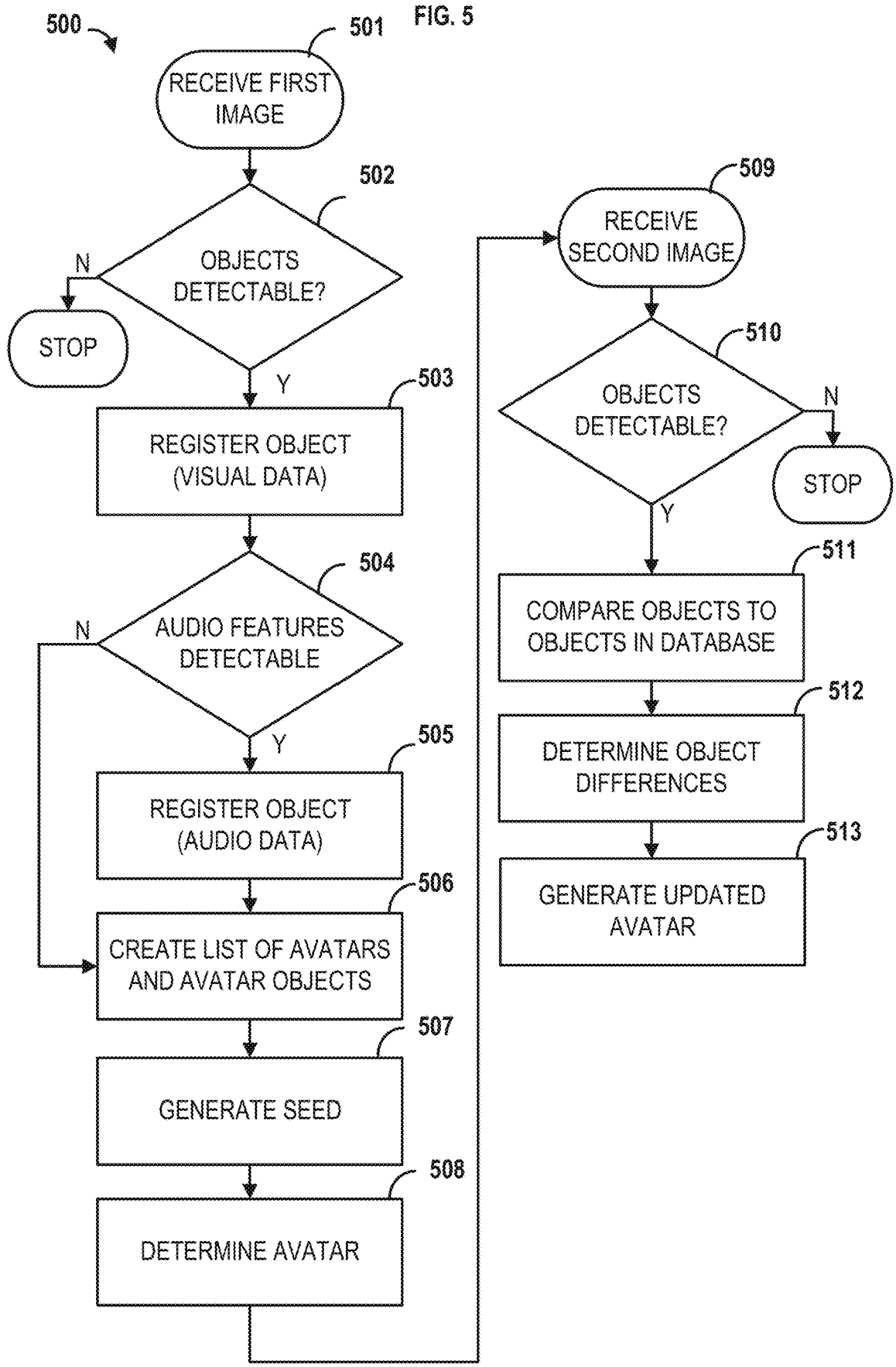

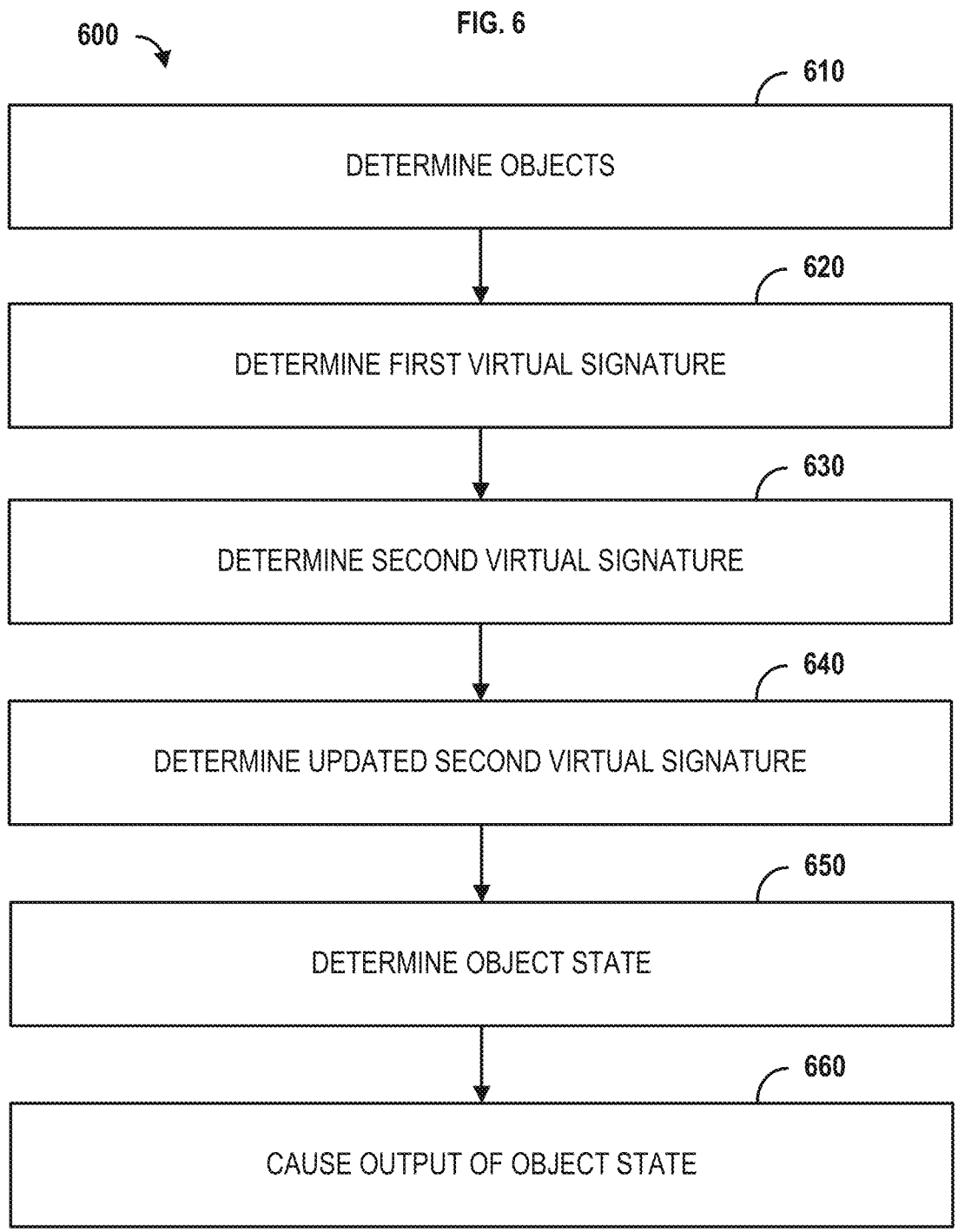

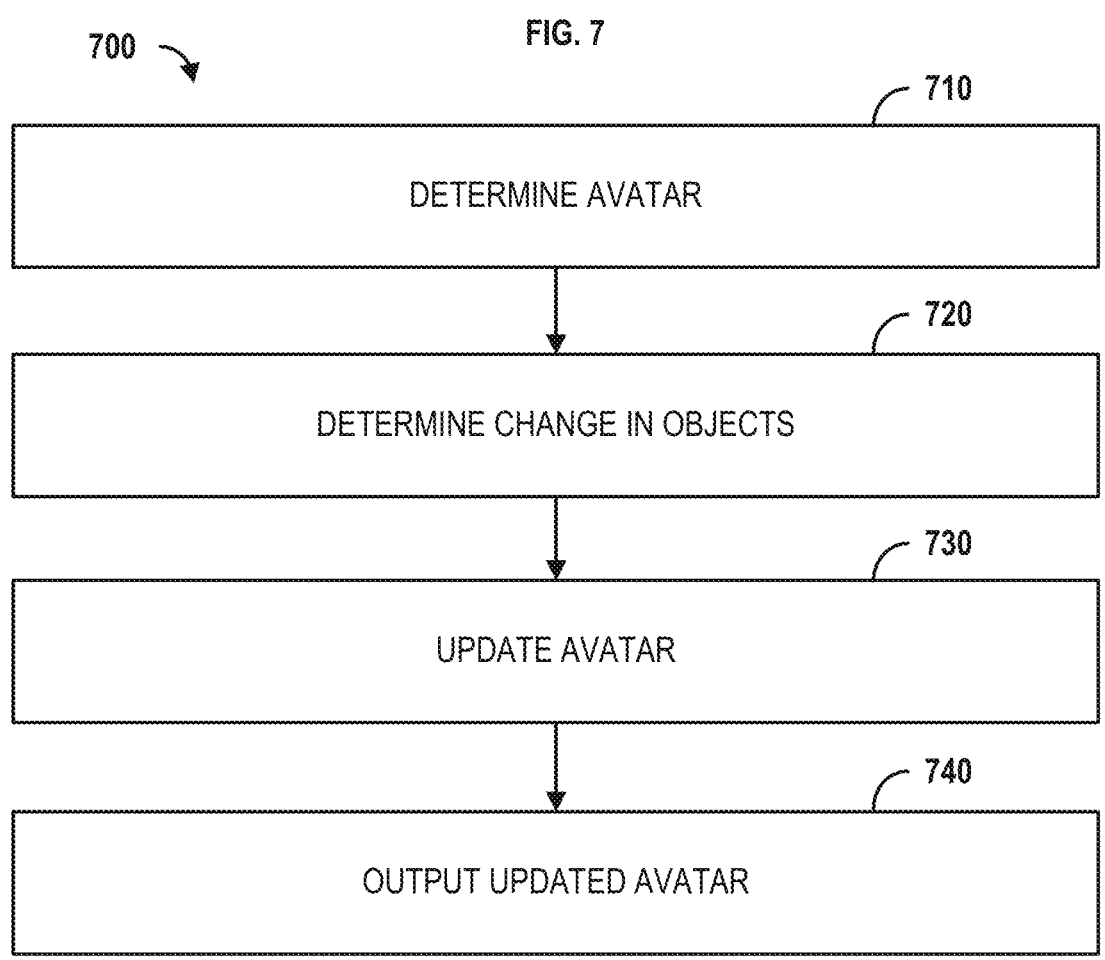

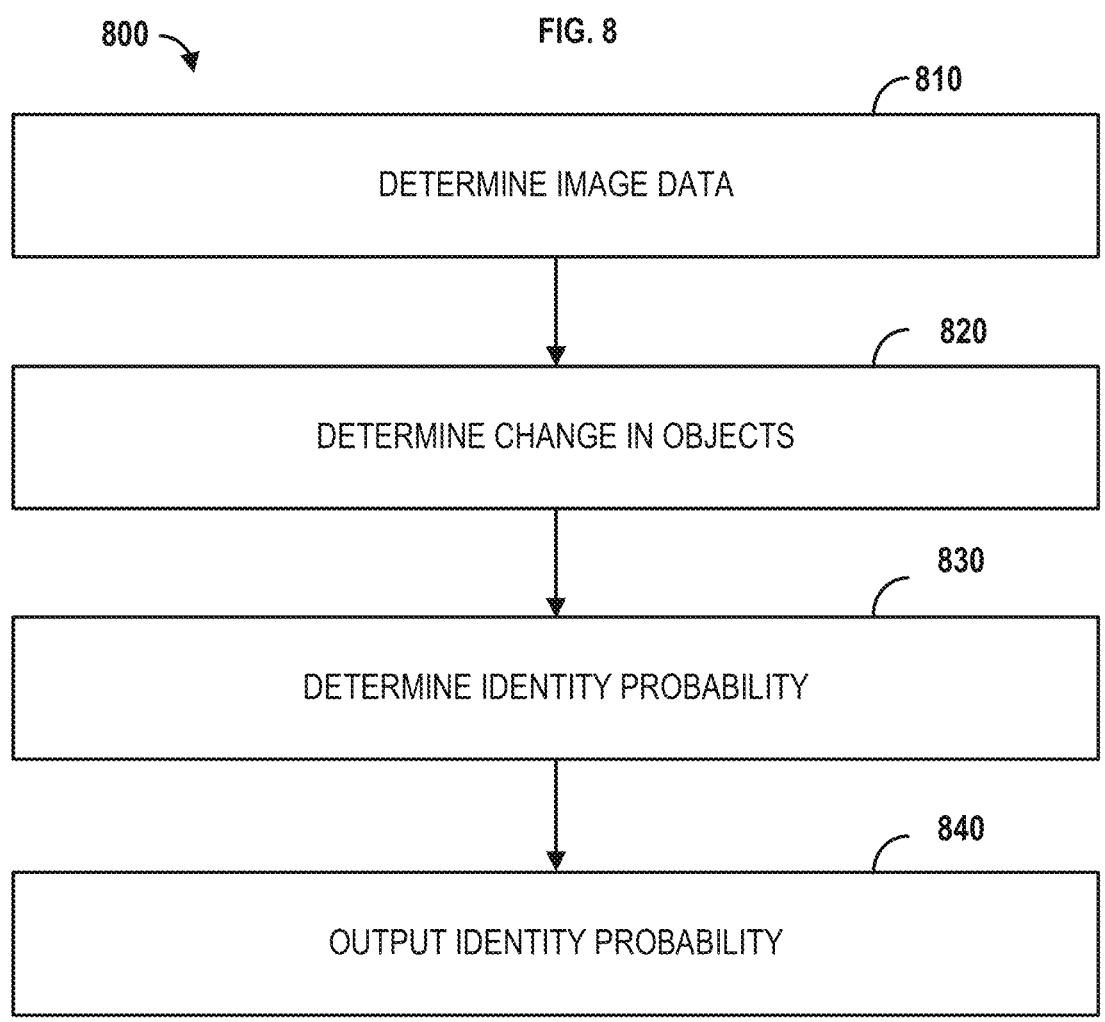

METHODS AND SYSTEMS FOR OBJECT TRACKING

BACKGROUND

As identity theft rises, protecting personal information is becoming increasingly important. Thus, it is becoming increasingly more important to hide or obscure personal information from third parties. However, most approaches are directed towards obscuring digital information. For example, encrypting communications is a typical approach to protecting identifying digital information however, this approach is only applicable to digital communications. There is also a need for direct observation of objects while obscuring physical information (e.g., physical identifiable features). There is presently no way to track physical assets while maintaining the anonymity of the asset. Thus, there is a need to track assets in real-time while simultaneously protecting the identity of the asset from unwarranted exposure. Tracking the assets may be performed for a fixed period of time.

SUMMARY

It is to be understood that both the following general description and the following detailed description is merely an example and is explanatory only and is not restrictive. Methods, systems, and apparatuses for monitoring assets (e.g., people, objects) while protecting the identity of the assets are described. A primary object may be determined as well as one or more accessory objects and one or more seeds. The one or more seeds may be, but are not limited, to an audio seed. The one or more accessory objects and the one or more seeds may be associated with the primary object. For each of the primary object, the one or more accessory objects, and the one or more seeds, a virtual signature may be determined and an avatar may be generated wherein the avatar may be associated with the primary object. As the primary object moves about a space, the identity of the primary object may be continuously confirmed via the virtual signature associated with the primary object. Similarly, changes in the one or more accessory objects may cause reconfirmation of the identity of the primary object to be within a specified degree of certainty by comparing virtual signatures associated with the primary object and the one or more accessory objects. As the one or more accessory objects associated with the primary object changes, the avatar associated with the primary object may also change. In order to preserve the integrity of personally identifiable information ("PII"), the identity of the primary object and associated PII may be deleted, for example, after a prescribed interval, ad-hoc, and/or after some event (e.g., the primary object exits the space.

BRIEF DESCRIPTION OF THE DRAWINGS

The accompanying drawings, which are incorporated in and constitute a part of this specification, illustrate embodiments and together with the description, serve to explain the principles:

FIG. 4 is a block diagram of an example operating environment

FIG. 5 is a block diagram of an example method;

FIG. 6 is a flowchart of an example method;

FIG. 7 is a flowchart of an example method;

FIG. 8 is a flowchart of an example method; and

DETAILED DESCRIPTION

Figure 1:
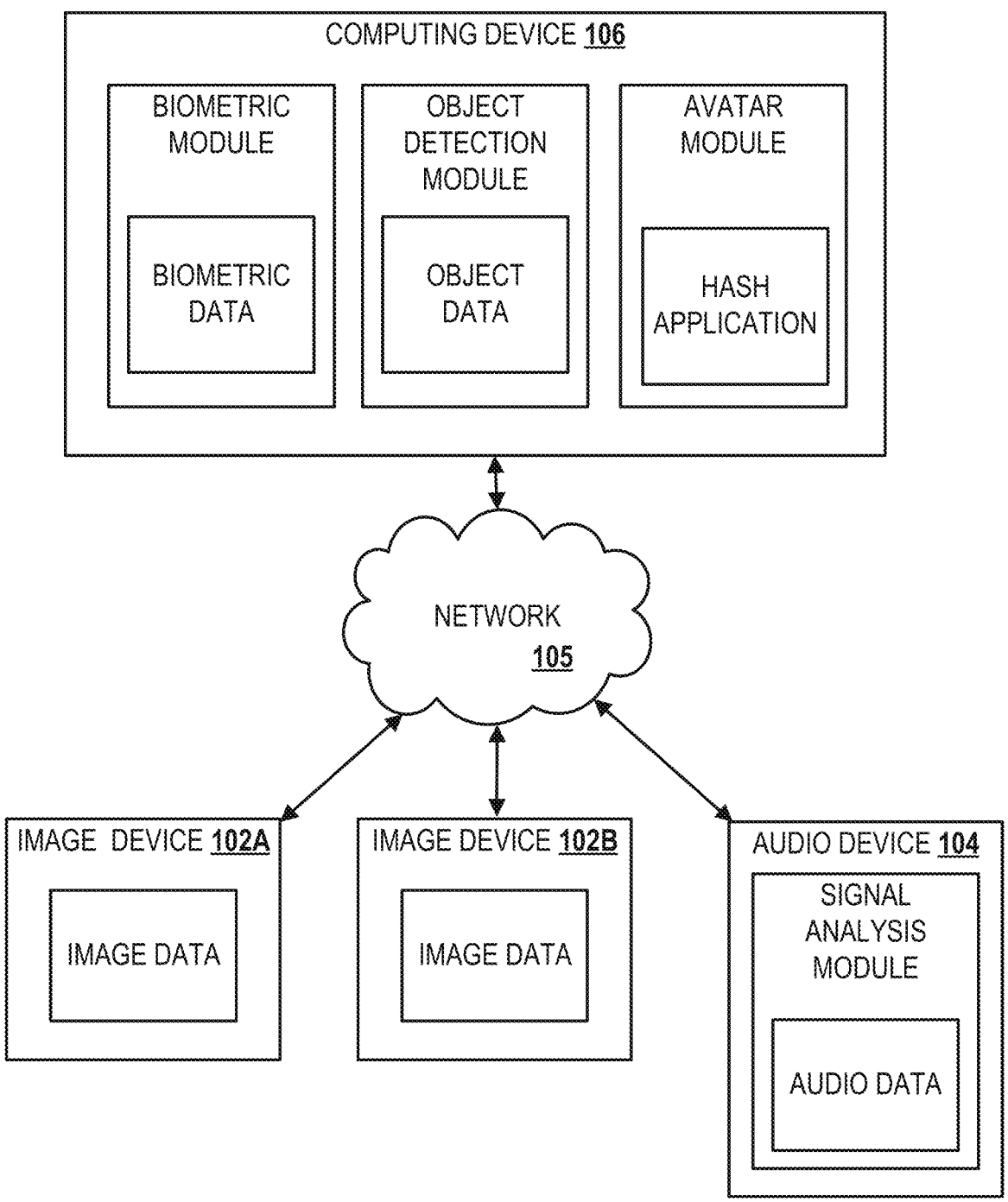
FIG. 1 is a block diagram of an example system and network.

Before the present content storing techniques are disclosed and described, it is to be understood that this disclosure is not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" or "example" means "an example of" and is not intended to convey an indication of a preferred or ideal embodiment. "Such as" is not used in a restrictive sense, but for explanatory purposes.

Disclosed are components that can be used to perform the disclosed content analysis and storage techniques. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present systems and methods may be understood more readily by reference to the following detailed description of preferred embodiments and the examples included therein and to the Figures and their previous and following description.

As will be appreciated by one skilled in the art, the object tracking and management techniques may take the form of an entirely hardware embodiment, an entirely software embodiment, or an embodiment combining software and hardware aspects. Furthermore, the content analysis and storage techniques may take the form of a computer program product on a computer-readable storage medium having computer-readable program instructions (e.g., computer software) embodied in the storage medium. More particularly, the present content analysis and storage techniques may take the form of web-implemented computer software. Any suitable computer-readable storage medium may be utilized including hard disks, CD-ROMs, optical storage devices, or magnetic storage devices.

Embodiments are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 shows an example system 100 in which the present methods and systems may operate. One skilled in the art will appreciate that provided herein is a functional description and that the respective functions can be performed by software, hardware, or a combination of software and hardware. The system 100 may facilitate object tracking and data management. The system may comprise one or more image devices 102A-B, an audio device 104, a network 105, and a computing device 106. The computing device 106 may be any computing device which may receive, process, distribute, and/or output data. The computing device 106, the one or more image devices 102A-B, and the audio device 104 may be configured to communicate through the network 105. The network 105 may facilitate sending data to and from the components of the system 100. The network 105 may be an optical fiber network, a coaxial cable network, a hybrid fiber-coaxial network, a wireless network, a satellite system, a direct broadcast system, or any combination thereof. The network 105 can be the Internet. A person skilled in the art will understand that the system 100 may comprise any number of image devices, audio devices, computing devices, and networks.

The one or more image devices 102A-B may be configured to capture, receive, determine, and/or generate image data (e.g., images, pictures, video, video frames, combinations thereof, the like, and/or data associated therewith). For example, the one or more image devices 102A-B may comprise a camera, a video camera, an infrared scanner or other thermal imager, an x-ray scanner or other medical imaging technology, a body scanner, any other suitable image technology, combinations thereof, and the like. The image data may comprise an image of a primary object and one or more accessory objects. For example, the primary object may be, but is not limited to a person, an animal, a vehicle, or any other object. For example, the one or more accessory objects may comprise at least one of: a bag, a hat, an umbrella, a pair of glasses, a shoe, a wristwatch, a bracelet, a ring, a piece of jewelry, a walking cane, an earring, a piercing, a tattoo, hair, hair color, a bow, a ribbon, a collar (e.g., a dog collar), a license plate, a decal, combinations thereof, and the like. The aforementioned one or more accessory objects are exemplary and explanatory only and a person skilled in the art will appreciate that the one or more accessory objects may comprise any object and/or any characteristic or property (e.g., size, shape, color, combinations and variations thereof, and the like) of the primary object.

The one or more image devices 102A-B may comprise one or more infrared lasers.

The one or more infrared lasers may be configured to use laser speckle measurements and/or spectrographic heartbeat detection to determine the primary object. In the laser speckle identification, the primary object may be recognized through laser scattering in a medium. The laser scattering may generate a reflected laser speckle pattern. The reflected laser speckle pattern may captured by an IR camera and processed using a convolutional neural network. After an adequate number of reflected speckles has been attained, a pattern may be determined. The pattern may be used as reference to track the primary object. For example, the one or more image devices 102A-B may comprise an infrared laser configured for biometric identification from a distance of up to 200 meters. Using this infrared laser, a receiver may be configured to detect reflected signals that represent a person's (e.g., primary object) heartbeat. Since every heartbeat is unique, the heartbeat may be processed to determine a match between any individual (e.g., the primary object). Thus, as the primary objects is tracked between a first location and a second location, for example, between rooms or floors, detection of the primary object's heartbeat may be used to confirm the primary object.

The computing device 106 may be configured to communicate with the one or more image devices 102A-B and/or the audio device 104. For example, the computing device 106 may receive, from the image device, image data. The image data may comprise first image data. The first image data may be associated with a first location and a first time. For example, the first image data may be associated with an entrance to a building, a security checkpoint, or other similar locations. The aforementioned locations are merely exemplary and explanatory and a person skilled in the art will appreciate that the first image data may be associated with any location anywhere. The image data may comprise image metadata associated with the image. For example, the image metadata may comprise timing data, location data, other data, combinations thereof, and the like. The image metadata may be configured for processing by the computing device 106.

The system 100 may be configured to enroll (e.g., register) a primary object and one or more accessory objects associated with the primary object. The one or more image devices 102A-B may be configured to determine (e.g., capture, receive) the image data. The one or more image devices 102A-B may send the image data to the computing device 106. The computing device 106 may receive the image data and analyze the image data as described herein. The image data may be analyzed according to at least one of, object detection, object recognition, facial detection, facial recognition, and/or the like.

The computing device 106 may comprise a biometric module. The biometric module may be configured to perform a biometric analysis. The biometric module may be configured to determine biometric data associated with the primary object. For example, the biometric data may comprise vectors between points on a face of a person (e.g., the primary object). For example, the biometric module may determine a plurality of vectors associated with the distances, points of interest (POIs), and/or regions of interest (ROIs) determined for one or more images. The computing device 106 may perform the biometric analysis so as to determine the primary object (e.g., the person) in the image data. The biometric analysis may comprise facial detection. Facial detection may comprise any methodology which identifies human faces in digital images. For example, the biometric module may utilize an algorithm to identify facial features by extracting landmarks, or features, from an image of a face. For example, the algorithm may analyze the relative position, size, and/or shape of the eyes, nose, cheekbones, and jaw by determining recognizable sizes, shapes, lines, shadows, etc. A person skilled in the art will appreciate that the aforementioned technique is merely exemplary and explanatory and is not limiting and that any appropriate facial detection technique may be used.

The biometric analysis may comprise facial recognition. Facial recognition may comprise any methodology configured to match a human face in a digital image or video to a human face stored in a database. For example, the biometric module may utilize an algorithm to identify facial features by extracting landmarks, or features, from an image of a face. For example, the algorithm may analyze the relative position, size, and/or shape of the eyes, nose, cheekbones, jaw, skin color, eyes, eyelids, eye colors, ears, hair, hair color, eyebrows, nose, lips, tongue, cheek, teeth, combinations thereof, and the like. These features may then be used to search for other images with matching features. A person skilled in the art will appreciate that the aforementioned technique is merely exemplary and explanatory and is not limiting and that any appropriate facial recognition technique may be used. The biometric analysis may comprise any biometric analysis such as viseme analysis, fingerprint/hand analysis, iris scan, voice analysis, combinations thereof, and the like.

The computing device 106 may comprise an object detection module configured to perform object detection and/or object recognition. For example, the computing device 106 may be configured to determine the image data comprises, for example, a vehicle and/or a person. As used herein, object detection may refer to the detection of an object (e.g., as opposed to a background such as a wall or empty space), while object recognition may refer to a determination that an object in, for example, second image data, is the same object that was captured in first image data. Object recognition and/or object detection may be used to determine the primary object out of all other objects in the image data. The computing device may be configured to perform a nearfield analysis on the image data to determine the primary object. For example, the nearfield analysis may comprise a fast region-based convolutional network (Fast R-CNN) method. For example, the nearfield analysis may comprise a mask region-based convolutional network (Mask R-CNN) method. Object detection may comprise extracting features from the image data. Features may be extracted from the image data once, more than once, at regular time intervals, etc. The features may be indications/representations of objects, shapes, actions, scenes, events, and/or the like occurring within the image data. The extracted features may be labeled with appropriate information (e.g., person, accessory object, background object, etc.).

Object detection may involve analysis of the image data (e.g., still photos and/or frame of video) received from the one or more image devices 102A-B, to recognize objects via a convolution operation, Region-based Convolutional Neural Network (R-CNN) operation, or the like, for example. Details associated with recognized objects of interest may be stored in a database. The details associated with recognized objects of interest may be stored in the database temporarily. For example, the details associated with recognized objects of interest may be stored for a period of time and then deleted from storage. Numerous object recognition techniques, including those described above, can be generally characterized as involving the processing of query data (e.g., the image data) to discern one or more aspects associated with an object-of-interest and thereafter querying an object registry containing information regarding a (potentially vast) multitude of registered or enrolled objects, all in an effort to identify which of the registered/enrolled objects most closely matches the discerned aspects. A person skilled in the art will appreciate that the aforementioned technique is merely exemplary and explanatory and is not limiting and that any appropriate object detection and/or object recognition technique may be used. The object detection module may be configured to determine the one or more accessory objects associated with the primary objects. For example, determining the one or more accessory objects may comprise performing a far field analysis. For example, the far field analysis may determine the one or more accessory objects. For example, the far field analysis may comprise a fast region-based convolutional network (Fast R-CNN) method. For example, the far field analysis may comprise a mask region-based convolutional network (Mask R-CNN) method. Once a registration scan is complete, the system may utilize one of many available facial recognition API's to identify and generate a list of accessory objects for a particular person (e.g., the primary object). For example, in the case that the primary object comprises a person, the accessory objects may comprise earrings/piercings, tattoos, bows, ribbons, hats, walking canes, umbrellas, wristwatches, shoes, jackets, jewelry, combinations thereof, and the like. For example, in the case that the primary object comprises a vehicle, the one or more accessory objects may comprise a front spoiler, a rear spoiler, an antenna, headlights, taillights, side-view mirrors, decals (e.g., a QR code, a sticker, or the like), a license plate, wheels, tires, an exhaust pipe, window tinting, vehicle features such as damage or paint, combinations thereof, and the like.

The computing device 106 may be configured to perform object registration. For example, whenever a new object (whether primary or accessory) is to be monitored or whenever a previously registered primary object is monitored and is missing an amount of accessory objects, or any other change has been determined (e.g., accessory objects have been added, switched, etc.), an object registration may be performed. The object registration may also be performed (and re-performed) periodically and/or upon request. The object registration process may comprise scanning an object visually and/or audibly. For the visual scan, in the case that the primary object is a person, an image device of the one or more image devices 102A-B (e.g., image device 102A) may perform a near field facial recognition routine and a far field external body scan of clothing and worn objects (e.g., the accessory objects). The primary object and the one or more accessory objects may be registered (e.g., "enrolled"). For the visual scan, in the case that the primary object is a vehicle, an image device of the one or more image devices 102A-B (e.g., image device 102A) may perform a near field recognition routine and a far field external scan of the accessory objects. For example, the near field recognition routine may identify a unique feature such as a decal (e.g., QR code, sticker, and the like), a license plate, or any other unique identifiable feature. The primary object and the one or more accessory objects may be registered (e.g., "enrolled"). The registration process may comprise determining, based on the primary object an initial primary virtual signature. The initial primary virtual signature may comprise data associated with the primary object. For example, the initial primary virtual signature may comprise a vectorization of the data associated with the primary object in the first image data. For example, the initial primary signature may comprise a histogram analysis of the primary object identified in the first image data. The initial primary virtual signature may be stored in a database. The initial primary virtual signature may be stored in the database temporarily. For example, the initial primary virtual signature may be stored for a period of time and then deleted from storage. The initial primary signature may be associated with the primary object (e.g., the person).

The object registration process may comprise determining an initial accessory virtual signature. The initial accessory virtual signature may be associated with the one or more accessory objects identified in the first image data. Similar to the initial primary virtual signature, the initial accessory virtual signature may comprise data associated with the one or more accessory objects. The initial accessory virtual signature may comprise a list of the one or more accessory objects associated with the primary object. For example, if the object detection and recognition analysis determines there is a backpack and an umbrella in the first image data, the initial accessory virtual signature may comprise a list of "backpack" and "umbrella." Likewise, in the case that the primary object is the vehicle, the initial accessory virtual signature may indicate the presence of the decal or the license plate or a spoiler or any other accessory. The initial accessory virtual signature may comprise a vectorization of the data associated with the one or more accessory objects in the first image data. The initial accessory virtual signature may comprise a histogram analysis of the one or more accessory objects identified in the first image data. The initial accessory virtual signature may be stored in a database. The initial accessory virtual signature may be stored in the database temporarily. For example, the initial accessory virtual signature may be stored in the database for a period of time and then deleted from storage. For example, the initial accessory virtual signature may be stored in the database for a period of 24 hours and then deleted. The aforementioned is merely exemplary and a person of skill in the art will appreciate that the initial accessory virtual signature may be stored in the database for any period of time and may be deleted at any time for any reason.

The audio device 104 may be configured to determine audio data. For example, the audio device 104 may comprise a microphone. The audio input may comprise, for example a spoken audio input such as a word or a phrase. The audio input may comprise mechanical sounds such as an engine revving or exhaust leaving an exhaust manifold. The audio input may comprise environmental audio input such ambient noise or some other audio input.

For example, the audio scan may involve the primary object (e.g., a person) speaking a phrase such as "Hello, I like unicorns" in order to generate voice data (e.g., an analog voice input). The phrase may be determined randomly. The voice data may be processed. For example, the analog voice input may be digitized (e.g., analog to digital conversion) to generate a digital voice input. The digital voice input may be converted to text. The text may comprise metadata tags. The metadata tags may comprise audio information such as timing, cadence, frequency, tone, and other audio information. The metadata tags may be used to sample the digitized voice input. A voice recognition algorithm may process the analog voice input. For example, the analog to digital information may be converted to text (additional metadata) and this text may be used to generate a random signal (e.g. a random seed). For example, the digitized voice input may be sampled and a frequency determined at each sample. For example, the digitized voice input may be sampled every 10 milliseconds (or randomly) and the respective frequencies used to generate a random signal to be used to generate a random seed. Additionally and/or alternatively, a spectral analysis may be performed so as to generate a spectral output. The spectral output may be buffered and processed to provide a random seed used to seed a random number generator.

In the case the primary object is a vehicle, the audio scan may involve the primary object generating some sound such as a sound of an engine revving or the sound of exhaust exiting an exhaust manifold. The sound of the engine revving may be unique to that vehicle and thus may be used in a similar fashion to spoken words to generate the random seed. For example, the engine revving or vehicle exhaust sound may be processed and the analog engine input may be digitized (e.g., analog to digital conversion).

The audio device 104 may be configured to determine a voice waveform. For example, the sampled voice waveform may be processed using an available speech to text word recognition API (e.g., Google speech API metadata fields) to create metadata for tagging a resulting avatar. The voice waveform may be used to determine a random seed. For example, the voice waveforms may be fed into an analog to digital converter. Quantized samples may be determined. For example, the quantized samples may be serially accumulated using an exclusive OR (XOR) Boolean function from the most significant bit (MSB) to the least significant bit (LSB) of each sample. This operation maintains the entropy of uncorrelated bits from the analog to digital conversion. These results may be fed into a 1-bit counter (also yielding an XOR function) and then into a buffer. After a predetermined number of sample times, a buffer value may be used as a power function coefficient to be raised for a pseudo random number generator (pRNG). This resulting random number may be used as a basis to select variations of the combination of the primary object and/or the one or more accessory objects detected during the registration process.

If the audio input is converted to text, the text may be converted into an ASCII string. The ASCII string values may be summed and then multiplied by the value of a current network time protocol (NTP) timestamp in nanoseconds (NTP timestamps are represented as a 64-bit unsigned fixed-point number, and represents the number of seconds that have elapsed since Jan. 1, 1900). For example, once synced to an NTP server, the command: "date+% 9N" will return the last 9 digits of the NTP time in nanoseconds. In this case, the noise fluctuations in the fractional time data become the source of entropy and produce results closer to a true random number generator.

The random seed may be expressed as:

$$Randomseed = \sum_{0}^{stringlength} (ASCII_{-digits}) \times NTP_{nanoseconds}$$

The random number generator may be used to anonymize (e.g., via a hash function) the initial primary virtual signature and the initial accessory virtual signature. For example, the initial primary virtual signature may serve as a key (e.g., an initial primary virtual signature key) to be input into the hash function and an anonymized primary virtual signature (e.g., a primary virtual signature hash) may be output. The hash function may comprise any suitable hash function. For example, the has function may comprise an identity hash function, a trivial hash function, a folding hash function, a mid-squares hash function, a division hash function, an algebraic hash function, a unique permutation hash function, a multiplicative hash function, a Fibonacci hash function, a Zobrist hash function or any other suitable hash function. The anonymized primary virtual signature may be associated with the primary object in the first image data. For example, the initial primary virtual signature may be stored in a database and associated, in the database, with the hash function used to generate the anonymized primary virtual signature. The initial primary virtual signature may be stored in the database temporarily. For example, the initial primary virtual signature may be stored in the database for a period of time and then deleted from storage. For example, the initial primary virtual signature may be stored in the database for a period of 24 hours and then deleted. The aforementioned is merely exemplary and a person of skill in the art will appreciate that the initial accessory virtual signature may be stored in the database for any period of time and may be deleted at any time for any reason.

Similarly, the initial accessory virtual signature may be input into the hash function and an anonymized accessory virtual signature may be output. Each of the anonymized primary virtual signature and the anonymized accessory virtual signature may be stored in the database. The hash function may comprise any suitable hash function. For example, the has function may comprise an identity hash function, a trivial hash function, a folding hash function, a mid-squares hash function, a division hash function, an algebraic hash function, a unique permutation hash function, a multiplicative hash function, a Fibonacci hash function, a Zobrist hash function or any other suitable hash function. The anonymized accessory virtual signature may be associated with the one or more accessory objects in the first image data. For example, the initial accessory virtual signature may be stored in a database and associated, in the database, with the hash function used to generate the anonymized accessory virtual signature. Each of the anonymized primary virtual signature and the anonymized accessory virtual signature may be stored in the database temporarily. For example, each of the anonymized primary virtual signature and the anonymized accessory virtual signature may be stored in the database for a period of time and then deleted from storage. For example, each of the anonymized primary virtual signature and the anonymized accessory virtual signature may be stored in the database for a period of 24 hours and then deleted. The aforementioned is merely exemplary and a person of skill in the art will appreciate that the initial accessory virtual signature may be stored in the database for any period of time and may be deleted at any time for any reason.

The computing device 106 may contain an avatar module. The avatar module may be configured to determine one or more avatars. The one or more avatars may be associated with the primary object and/or the one or more accessory objects. For example, when the primary object is registered (e.g., after the anonymized primary virtual signature is determined), the primary object may be assigned an avatar. The avatar module may contain the randomization engine. For example, determining the avatar may comprise randomly selecting, from the database, based on (e.g., assigned to or related to) the anonymized primary virtual signature, the avatar. For example, using objects created and stored in the database (e.g., the primary object and/or the one or more accessory objects and their associated metadata), along with a random series of avatar templates (templates may include non-human variations such as animals, insects, robots or other species) also stored in the database, the system may construct an avatar. For example, if the primary object comprises a young boy with dark hair and glasses, the primary object may be randomized into an avatar comprising a white dog with a red collar and blue socks. There may be no correlation between the primary object or the accessory objects and the resulting avatar. Accordingly, the identity of the primary object and the one or more accessory objects may be obfuscated. However, the identity of the primary object and the true number and description of accessories may be maintained in the database for tracking purposes. The identity of the primary object and the true number and description of accessories may be maintained in the database for a fixed period of time. For example, the identity of the primary object and the true number and description of accessories may be periodically removed from the database. For example, the identity of the primary object and the true number and description of accessories may be saved in a temporary database/file. The temporary database/file may be periodically wiped (e.g., the data removed).

The avatar may be stored in storage (e.g., the temporary database/file). For example, as each primary object and associated one or more accessory objects are registered, the identified primary objects and associated one or more accessory objects are created and stored in a temporary database. At this time, an avatar lifespan timeframe may be established. The lifespan timeframe associated with the avatar may indicate a period of time after which the avatar may be deleted from storage. That is to say, the avatar associated with the primary object may be semi-permanent. The avatar lifespan timeframe may be reset if it is determined there has been a change in the avatar. For example, if the avatar lifespan timeframe is initially set to four hours, but a change in the avatar is determined after three hours, the avatar lifespan timeframe may be reset to an additional four hours starting from the time when the change in the avatar was determined. The aforementioned is merely exemplary and a person skilled in the art will appreciate that the avatar lifespan timeframe may be set to any length of time and adjusted for any reason.

Similarly, the avatar module may be configured to determine one or more avatar accessory objects. The one or more avatar accessory objects may be counted so the one or more avatar accessory objects may be used later in an identity calculation to determine if any percentage of the one or more accessory objects (e.g., the real-world, physical accessory objects associated with the primary object) has been removed or added. Thresholds may be established to generate alerts to users of the monitoring system as described below.

The computing device 106 may be configured to receive second image data. For example, if the first image data is captured by the image device 102A at a first location (e.g., the entrance to a building), the second image device 102B may capture, at a second time and location, the second image data and send the second image data to the computing device 106 via the network 105. The second image data be associated with a second location (e.g., a second room or floor). In the case that the primary object is, for example, a vehicle and not a person, the first location may comprise, for example, a first point on a roadway and the second location may comprise a second point on a roadway. Similarly, the first location may comprise a first tollbooth, a first intersection, a first parking spot, combinations thereof, and the like. Similarly, the second location may comprise, for example, a second point on a roadway, a second tollbooth, a second intersection, a second parking spot, combinations thereof, and the like. The aforementioned locations are merely exemplary and explanatory and a person skilled in the art will appreciate that the first location and second location may be any location anywhere as defined by any parameters (e.g., GPS coordinates, relative proximity, a combination of metes and bounds or any other parameter used to define a location). The computing device 106 may determine the primary object is included in the second image data. Determining the primary object in the second image data may comprise generating, in a similar fashion as the initial primary virtual signature, a subsequent primary virtual signature. Generating the subsequent primary virtual signature may comprise performing facial detection and recognition (as described above) on the second image data to determine the primary object in the second image data. The aforementioned is not limiting. For example, a person skilled in the art will appreciate that in the case that the primary object does not comprise a person, generating both the initial primary virtual signature and the subsequent primary virtual signature may comprise determining any unique feature associated with the primary object. For example, in the case that the primary object is a vehicle, determining the initial primary virtual signature and the subsequent primary virtual signature may comprise determining a unique feature about the vehicle such as, for example, a decal (e.g., QR code or the like), a license plate, or any other identifiable feature. Upon determining the primary object in the second image data, the computing device 106 may generate the subsequent primary virtual signature in a similar fashion as generating the initial primary virtual signature. The subsequent primary virtual signature may be substantially the same as the initial primary virtual signature. Based on the subsequent primary virtual signature, the computing device 106 may determine the random seed (e.g., the random seed used to generate the anonymized initial primary virtual signature) and thereby determine the hash function. The computing device 106, may input into the hash function, the subsequent primary virtual signature and, based on the hash function seeded with the random seed, determine a subsequent anonymized primary virtual signature. The computing device 106 may determine the subsequent anonymized primary virtual signature is substantially similar and/or identical to the initial anonymized primary virtual signature and thus determine that the primary object in the second image data is the same as the primary object in the first image data.

Based on the second image data, the computing device 106 may determine if one or more accessory objects are included in the second image data. Determining if one or more accessory objects are in the second image data may comprise generating, in a similar fashion as the initial accessory virtual signature, a subsequent accessory virtual signature. Generating the subsequent accessory virtual signature may comprise performing object detection and/or recognition (as described above) on the second image data to determine the one or more accessory objects in the second image data. Upon determining one or more accessory objects in the second image data, the computing device 106 may generate the subsequent accessory virtual signature in a similar fashion as generating the initial accessory virtual signature. The subsequent accessory virtual signature may be substantially the same as the initial accessory virtual signature. Based on the subsequent accessory virtual signature, the computing device 106 may determine the random seed (e.g., the random seed used to generate the anonymized initial primary virtual signature) and thereby determine the hash function. The computing device 106, may input, into the hash function, the subsequent accessory virtual signature and, based on the hash function seeded with the random seed, determine a subsequent anonymized accessory virtual signature. The computing device 106 may determine the subsequent anonymized accessory virtual signature is identical to, substantially similar to, or different from the initial anonymized accessory virtual signature and thus determine that the one or more accessory objects in the second image data are either the same as the one or more accessory objects in the first image data, that the one or more accessory objects in the second image data are different from one or more accessory objects in the first image data, or one or more accessory objects in the first image data are missing from the one or more accessory objects in the second image data. For example, if the one or more accessory objects in the second image data are different than the one or more accessory objects in the first image data, the computing device 106 may determine that at least one accessory objects of the one or more accessory objects in the second image data is different from at least one accessory object of one or more accessory objects in the first image data (e.g., the backpack or the umbrella is missing).

Similarly, the computing device 106 may determine, independently of a determination related to the primary object, that the one or more accessory objects are included in the second image data. For example, the computing device 106 may receive the second image data and determine the primary object is not present in the second image data. The computing device 106 may determine, however, based on subsequent anonymized accessory virtual signature, that the one or more accessory objects are in the second image data. Based on the determination that the primary object is absent from the second image data, but the one or more accessory objects are present in the second image data, the computing device 106 may determine that one or more accessory objects are now associated with an alternate primary object (e.g., a different person). If the computing device 106 determines that the one or more accessory objects are now associated with the alternate primary object, the computing device 106 may send a message. The message may indicate that the one or more accessory objects in the second image data are no longer associated with the primary object and rather are now associated with an alternate primary object.

For example, a threshold formula may be implemented. The threshold formula may comprise $$\text{Identity} = Wx * \sum_{f=0}^{fmax} (\text{Nearfield objects}) + \sum_{b=0}^{bmax} (\text{farfield objects})$$

Where Wx is a weight for enhancing facial objects because it is used for biometric recognition and nearfield and farfield objects may comprise a total counts of each type of object in the database. Wx may be selected based on the sensitivity of the AI API to facial variations. From this comparison, thresholds can be established for various types of alerts based on whether or not the monitoring system can detect the initial type and count of objects. For example, a threshold may comprise: 0%-10% missing/changed=no alert. From 11%-25% missing/changed=low alert (display icons of missing/changed objects). From 26%-50% missing/changed=warning (display icons of missing/changed objects). Above 50% =Alarm (too many objects changed) missing/undetectable object (silhouette icon). Based on a determined change satisfying or failing to satisfy a threshold, an alarm signal may be sent to an application and/or system such as a security system. For example, the alarm signal may be configured to cause an alert to be displayed on a screen or sent in a message. As one of skill in the art will appreciate, the alarm signal may be sent via wired or wireless network.

The computing device 106 may be configured to determine, based on the avatar and the difference between the initial anonymized accessory virtual signature and the subsequent anonymized accessory virtual signature, an updated avatar. The updated avatar may be associated with one or more updated avatar accessory objects For example, if the avatar comprises a ladybug, the updated avatar may also comprise a ladybug. The updated avatar, however, may comprise different avatar accessory objects. The difference in avatar features may be associated with the difference in the one or more accessory objects (e.g., the real-world, physical one or more accessory objects). For example, if the avatar associated with the first image data (e.g., the first image data comprising the hat, the backpack, the umbrella, and the pair of gloves) comprises a ladybug with a fishing pole, the updated avatar (e.g., the updated avatar associated with the second image data comprising the hat, the backpack, no umbrella, and only a single glove) may comprise a ladybug without a fishing pole, and instead the ladybug may be carrying a lunchbox.

The computing device 106 may comprise a temporary storage. For example, the temporary storage may be cleared (e.g., the data deleted) after a period of time. The period of time may be determined by any suitable means. For example, a chronographic function may determine the period of time. For example, the chronographic function may comprise executing an OS command at a particular time. For example, the OS command may comprise:

find $search_path -exec rm { }\;

where "path" represents a directory containing the database and "-exec rm { }" will delete the directory.

Figure 2:
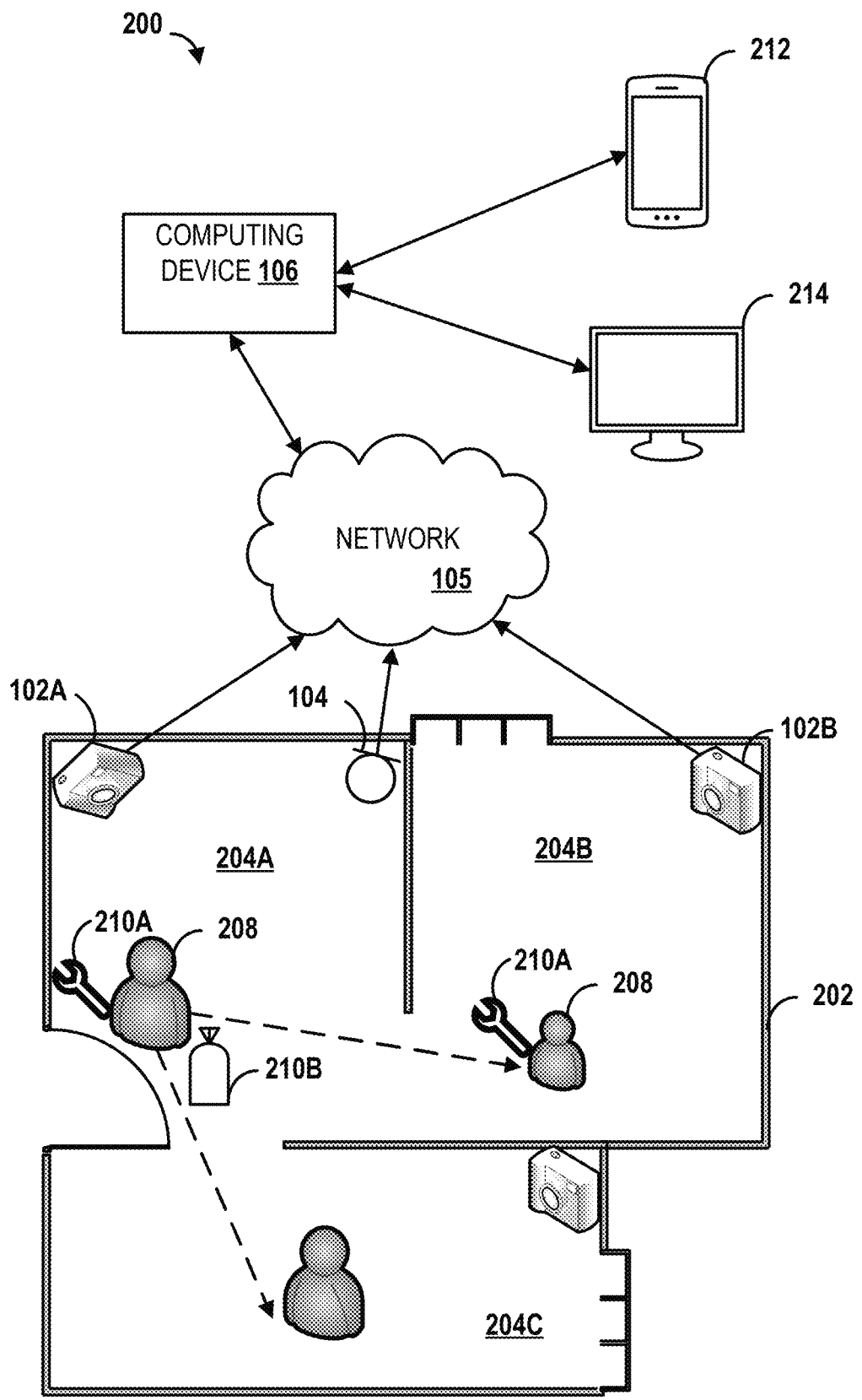
FIG. 2 is a block diagram of an example system and network.

For example, directory files may be deleted within a time period relative to when the directory files were created. For example, a mmin command may be executed. For example, the mmin command may comprise:

$ find ./* -mmin+60 -type d -exec rm -rdf { }\;

FIG. 2 shows an example environment 200 in which the present methods and systems may operate. The environment 200 may comprise a premises 202. The premises may comprise, for example, a museum, an airport, a jail, or any other structure. The premises 202 may comprise one or more rooms 204A,B,C. The premises 202 may comprise the one or more image devices 102A-B of FIG. 1. The environment may comprise the audio device 104 of FIG. 1. The first image device 102A may detect an object (e.g., a person). The object may be the primary object 208. The first image device 102A may capture first image data. The first image data may comprise an image of the primary object 208 and one or more accessory objects 210A-B. In FIG. 2, the one or more accessory objects comprise a first accessory object 210A (e.g., a wrench) and second accessory object 210B (e.g., a bag), however, a person skilled in the art will appreciate that the one or more accessory objects may comprise any objects such as umbrellas, backpacks, hats, canes, jewelry, wheelchairs, combinations thereof, and the like. For example, the first image device 102A may capture an image of the primary object 208. The image device 102A may capture the image of the primary object 208, for example, upon entry to the premises. The second image device 102B may capture the second image data in a different room. The second image data may comprise the primary object 208. The second image data may comprise one or more of the one or more accessory objects 210A and 210B. For example, the second image data may comprise the primary object 208, the first accessory object 210A, but not the accessory object 210B.

Both the first image device 102A and the second image device 102B may be configured to send the first and second image data to the computing device 106 via the network 105. The computing device 106 may be configured to process the image data as described above. The audio device 104 may be configured to send the audio data to the computing device 106 via the network 105. The computing device 106 may be configured to receive the audio data. The computing device 106 may be configured to process the audio data as described above. For example, the computing device 106 may process the audio data to generate the seed. Based on the seed, the computing device 106 may determine an avatar as described above. The computing device 106 may cause output of the avatar. For example, the computing device 106 may cause the avatar to be displayed on a mobile device 212 and/or a display device 214.

Figure 3A:
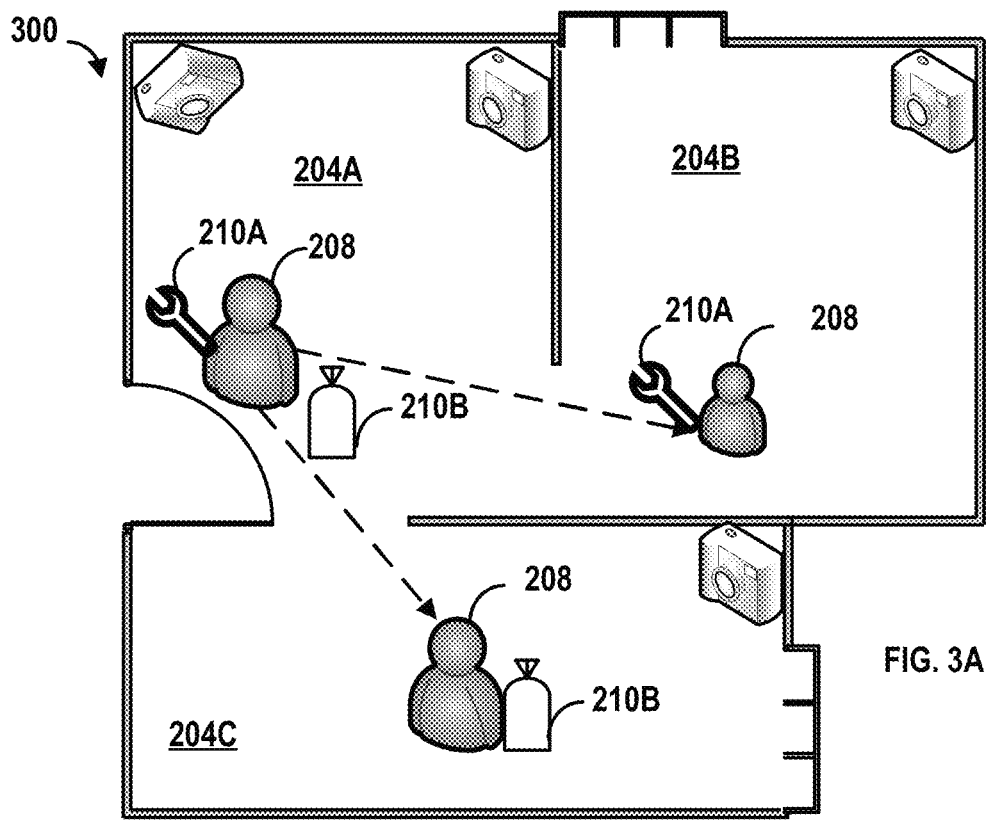
FIG. 3A is a block diagram of an example operating environment.

FIG. 3A shows an example environment 300 in which the present systems and methods may operate. The primary features of environment 300 were described with reference to FIG. 2. However, FIG. 3A serves to illustrate an example use case wherein the primary object 208 moves about the premises from room 204B to room 204A and onto room 204C. As can be seen, while the primary object is in room 204B, the primary object 208 is in possession of the first accessory object 210A. While the primary object is in room 204A, the primary object 208 is in possession of the both the first accessory object 210A and the second accessory object 210B. While the primary object 208 is in room 204C, the primary object 208 is in possession of only the second accessory object 210B.

Figure 3B:
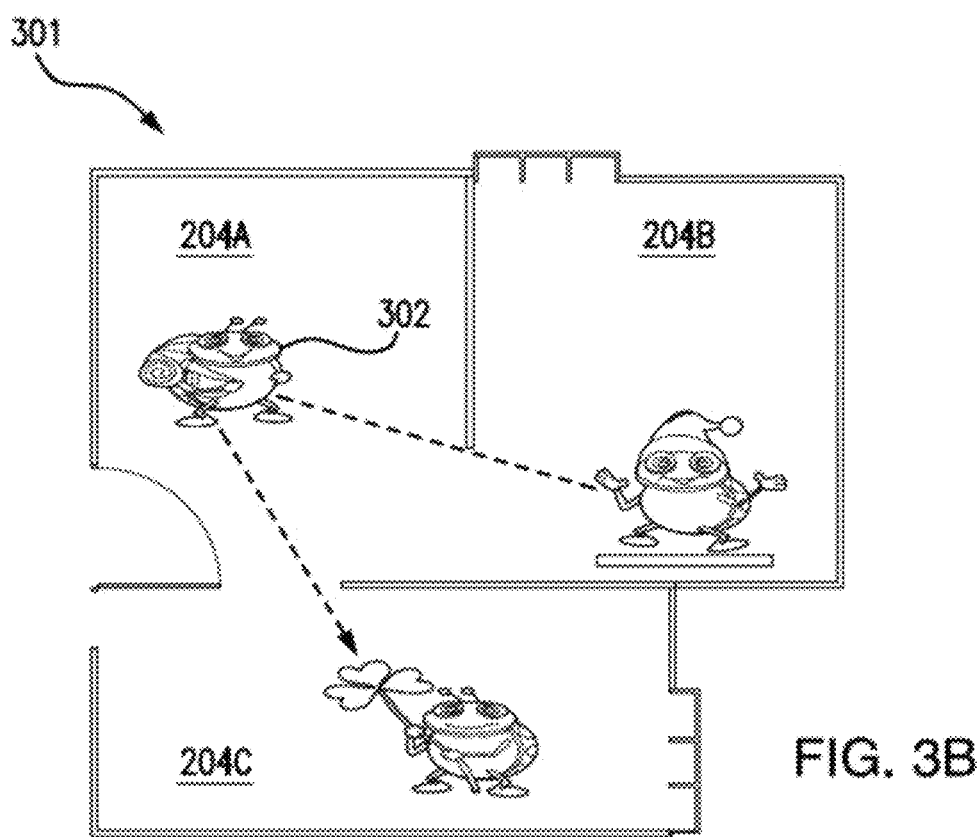
FIG. 3B is a block diagram of an example operating environment.

FIG. 3B shows a virtual premises 301 of the present systems and methods. The virtual premises 301 corresponds to the premises 202 of FIG. 2. The virtual premises 301 may comprise a visualization to be output via one or more of the mobile device 212 and/or the display device 214. For example, the avatar 302 may be the avatar determined based on the first image data. For example, the avatar 302 may comprise one or more features associated with the one or more accessory objects 210A and 210B. For example, the avatar 302 may have a first feature and a second feature. For example, the first feature may comprise a backpack and the second feature may comprise the antenna on the head of the ladybug. As the primary object 208 moves around the premises 202, the avatar associated with the primary object (e.g., the ladybug avatar 302) may also move about the virtual premises 301. Similarly, as the one or more accessory objects associated with the primary object changes, so too may the features of the avatar 302. The change in the features of the avatar 302 may indicate a change in the one or more accessory objects associated with the primary object 208. The change in the one or more accessory objects may comprise a change in at least one of: a physical appearance of the at least one object, or physical property of the at least one accessory object, a change in a presence of the at least one accessory object, or a change in an absence of the at least one accessory object. For example, if the first image data comprises accessory objects such as a hat, a backpack, an umbrella, and a pair of gloves, the second image data may comprise the hat, the backpack, and a single glove. That is to say, the umbrella and one glove may be absent from the second image data and thus comprise a change in the one or more accessory objects. Similarly, the change in the one or more accessory objects may comprise a change in a physical appearance and/or physical property of the one or more accessory objects. For example, in the case that the primary object is a vehicle comprising one or more accessory objects such as a green rear spoiler and an absence of damage to the vehicle, the change in the one or more accessory objects may comprise in color of the rear spoiler (e.g., from green to red) and the appearance of a large scratch down the side of the vehicle. For example, as the primary object 208 of FIG. 3A moves from room 204A to room 204B, the primary object 208 may "lose" the second accessory object 210B. As such, the features of the avatar 302 may change from a backpack in room 204A to a hat in room 204B. Likewise, if the primary object 208 moves from room 204A to room 204C, and in the course of moving from room 204A to room 204C loses the accessory object 210A (e.g., the wrench), the features associated with the avatar 302 may also change. For example, the avatar 302 is wearing a backpack in room 204A, but is not wearing the backpack in room 204C and is instead holding a shamrock.

FIG. 4 shows an example operating environment in which the present systems and methods may operate. FIG. 4 serves to illustrate an example use case wherein the primary object comprises a vehicle 402. While in this example the primary object comprises the vehicle 402, this is example is merely exemplary and explanatory and a person skilled in the art will appreciate that the primary object may comprise any object or person or animal or any other arrangement of matter. For example, the primary object may comprise a boat, a plane, a helicopter, a person, a dog, a cat, and/or any other living being or inanimate object. In scenario 400, the first image data may be captured. The first image data may be captured by any appropriate technology such as, for example, a camera. The first image data may be associated with a first location. For example, the camera may be positioned at a stop light or a toll-both or another location where it is able to capture the first image data. The aforementioned are not intended to be limiting and a person skilled in the art will appreciate that the first location may be any location anywhere on earth.

Object detection and recognition may be performed on the first image data so as to determine the primary object comprises the vehicle 402. Object detection and recognition may be performed on the first image data so as to determine the primary object is associated with one or more accessory objects. For example, the vehicle 402 may be associated with a front spoiler. The primary object may be registered. The object registration process may comprise determining, based on the primary object, an initial primary virtual signature. The initial primary virtual signature may comprise data associated with the primary object. For example, the initial primary virtual signature may comprise a vectorization of the data associated with the primary object in the first image data. For example, the initial primary signature may comprise a histogram analysis of the primary object identified in the first image data. The initial primary virtual signature may be stored in a database. The initial primary signature may be associated with the primary object (e.g., the vehicle).

The object registration process may comprise determining an initial accessory virtual signature. The initial accessory virtual signature may be associated with the one or more accessory objects identified in the first image data (e.g., the spoiler). Similar to the initial primary virtual signature, the initial accessory virtual signature may comprise data associated with the one or more accessory objects. The initial accessory virtual signature may comprise a list of the one or more accessory objects associated with the primary object. The initial accessory virtual signature may comprise a vectorization of the data associated with the one or more accessory objects in the first image data. The initial accessory virtual signature may comprise a histogram analysis of the one or more accessory objects identified in the first image data. The initial accessory virtual signature may be stored in a database.

Audio data may be determined. For example, an audio device may be configured to determine the audio data. For example, the audio device may comprise a microphone. For example, the audio device may be configured to receive an audio input. The audio input may comprise, for example a spoken audio input such as a word or a phrase. The audio input may comprise environmental audio input such ambient noise or some other audio input (e.g., the sound of the vehicle's exhaust or some other sound). Determining the audio data may comprise executing an audio scan to determine an analog audio input. A spectral analysis may be performed so as to generate a spectral output. The spectral output may be buffered and processed to provide a random seed used to seed a random number generator.

An avatar may be determined according to the methods described above. For example, in scenario 401, the avatar 404A may be associated with the primary object 402 comprising the front spoiler. Scenario 401 illustrates an example display that may be associated with object registration (e.g., while the primary object 402 is still at the first location). Scenario 403 illustrates an example display that may be associated with second image data indicating the primary object 402 has changed locations. In scenario 403, the avatar 404B may be associated with the vehicle 402B comprising a rear spoiler, rather than the front spoiler. Accordingly, by virtue of the change in accessory objects, the avatar 404B in scenario 403 appears a different shade than the avatar 404A in scenario 401.

FIG. 5 shows an example method 500. At step 501, a first image may be received.

For example, the first image may be captured by the first image device 102A. The first image may comprise any type of image (e.g., a photograph and/or video or frames of video or the like). For example, the first image device 102A may comprise a camera, video camera, thermal imager, radio-imager (e.g., an x-ray machine), medical imaging technology, combinations thereof, and the like. The first may be sent to a computing device. The first image may be received by the computing device. For example, the first image device 102A may capture the first image, determine first image data, and send the first image and/or the first image data to the computing device 106. Likewise, the computing device 106 may determine the first image data. The first image data may be associated with a first time and a first location. For example, the first image data may be captured at an entrance to a premises.

At 502, a determination may be made as to whether one or more objects are detectable in the first image. For example, facial detection may be performed to determine a primary object (e.g., a person). The computing device 106 may perform biometric analysis so as to determine the primary object (e.g., the person) in the image data. For example, the computing device 106 may perform facial detection. Facial detection may comprise determining a facial model of a human face associated with the person, and comparing the facial model to known facial models. Determining the facial model of the human face may comprise determining a plurality of vectors associated with distances, points of interest (POIs), and/or regions of interest (ROIs) associated with the human face. For example, the biometric module may utilize an algorithm to identify facial features by extracting landmarks, or features, from an image of a face. For example, the algorithm may analyze the relative position, size, and/or shape of the eyes, nose, cheekbones, and jaw by determining recognizable sizes, shapes, lines, shadows, etc. A person skilled in the art will appreciate that the aforementioned technique is merely exemplary and explanatory and is not limiting and that any appropriate facial detection technique may be used.

Object detection may be performed to determine one or more accessory objects (e.g., jewelry, clothing, walking canes or umbrellas, combinations thereof, and the like). The object detection module may be configured to determine the one or more accessory objects. For example, determining the one or more accessory objects may comprise performing a far field analysis. The far field analysis may determine the one or more accessory objects. The far field analysis may comprise a fast region-based convolutional network (Fast R-CNN) method. The far field analysis may comprise a mask region-based convolutional network (Mask R-CNN) method. Once a registration scan is complete, the system may utilize one of many available facial recognition API's to identify and generate a list of accessory objects for a particular person (e.g., the primary object). For example, accessory objects may comprise earrings/piercings, tattoos, bows, ribbons, hats, walking canes, umbrellas, wristwatches, shoes, jackets, jewelry, combinations thereof, and the like.

At step 503, at least one object of the one or more objects may be registered as described above. For example, the primary object may be registered based the image data. Registering the at least one object of the one or more objects may comprise processing the image data to generate the initial primary virtual signature, the anonymized primary virtual signature, the initial accessory signature, and the anonymized accessory signature as described above. Registering the at least one object of the one or more objects may comprise storing metadata associated with the least one object. For example, metadata related to facial detection and recognition may be stored in a database. For example, the one or more objects may be stored in a database.

At step 504, a determination may be made as to whether or not audio features are detectable. The audio features may comprise features of an audio input. For example, the audio input may comprise a spoken phrase. For example, a person may speak a phrase into a microphone (e.g., the audio device 104). The audio input may comprise an ambient noise. The audio input may be received in an analog form (e.g., via soundwaves) and converted to a digital format. Audio data may be generated based on the audio input. For example, the audio data may comprise audio features. The audio features may be determined using known feature detection methods. For example, the converted audio input may be randomly sampled to determine audio features comprising frequency, cadence, tone, volume, combinations thereof, and the like. The audio features may be hashed (via the hashing application) to generate a seed to be used in a randomization engine.

At step 505, the at least one object may be registered by being associated with the audio data as described above. "Registering" or "registration" may refer to enrolling physical and/or virtual objects into one or more object registries on which subsequent processing may be performed for a specified time period. For example, the at least one object may be associated with the audio data in a database. For example, the at least one object may be associated with an object identifier and the audio data may be associated with the same object identifier. The object identifier may comprise a temporal element (e.g., the time at which the image data in which the at least on object is present was captured). Likewise, the audio data may comprise a temporal element (e.g., the time at which the audio data was captured) which may be the same as, or substantially similar to the temporal element associated with the object identifier. Thereby, in subsequent processing, when the at least one object is determined in subsequent image data, the audio data may be retrieved for use in subsequent processing.

At step 506, a list of avatars may be determined. Determining the list of avatars may comprise selecting at least one avatar of one or more avatars from a database. For example, the one or more avatars may comprise one or more icons. For example, a first avatar may comprise a ladybug. For example, a second avatar may comprise an owl. Determining the list of avatars may further comprise determining a list of avatar objects (e.g., accessory objects associated with the one or more avatars). For example, a first avatar objects may comprise a backpack. For example, a second avatar object may comprise a fishing pole.

At step 507, a random seed may be generated. The random seed may be generated based on the audio features. For example, the audio features may be digitized and hashed in order to generate the random seed. The random seed may be used to randomize the list of avatars and avatar objects. For example, the list of avatars and avatar objects may be associated with a first order. For example, the first order may be input into a randomization engine which has been seeded with the random seed. The output may comprise the list of avatars and avatar objects associated with a second order.

At step 508, an avatar may be determined. For example, the avatar may be determined by using the random seed to randomly select the avatar and the one or more avatar objects from the list of avatars and avatar objects. The avatar and the one or more avatar objects may be stored in database (e.g., a temporary database). Determining the avatar may comprise selecting, based on the random seed, the avatar from a database.

At step 509 a second image may be received. For example, the second image may be received by the second image device 102B. For example, the second image device 102B may comprise a camera, video camera, thermal imager, radio-imager (e.g., an x-ray machine), medical imaging technology, combinations thereof, and the like. For example, the second image may be received by a computing device. For example, the second image device 102B may capture the second image, determine second image data, and send the second image and/or the second image data to the computing device 106. The second image may be associated with a second time and a second location. For example, the second image data may be captured in an anterior room of the premises.

At step 510 a determination may be made as to whether or not one or more objects are detectable in the second image. For example, facial detection and recognition may be performed to determine the primary object (e.g., the person). For example, object detection and recognition may be performed to determine the one or more accessory objects (e.g., jewelry, clothing, walking canes or umbrellas, combinations thereof, and the like).

At step 511, the one or more objects detected in the second image may be compared to the one or more objects in the first image (e.g., the one or more objects stored in the database). For example, facial detection may be performed on the second image data. Facial detection may comprise generating a facial model of a human face associated with the person, and comparing the facial model to one or more known facial models. Generating the facial model of the human face may comprise determining a plurality of vectors associated with distances, points of interest (POIs), and/or regions of interest (ROIs) associated with the human face. For example, the biometric module may utilize an algorithm to identify facial features by extracting landmarks, or features, from an image of a face. For example, the algorithm may analyze the relative position, size, and/or shape of the eyes, nose, cheekbones, and jaw by determining recognizable sizes, shapes, lines, shadows, etc. If the generated facial model is substantially similar to the one or more known facial models, it may be confirmed that the one or more objects detected in the second image comprises a face. A person skilled in the art will appreciate that the aforementioned technique is merely exemplary and explanatory and is not limiting and that any appropriate facial detection technique may be used. A human face may be detected as a result of the facial detection.

If the human face is detected, facial recognition may be performed. Facial recognition may comprise any methodology configured to match a human face in a digital image or video (e.g., the second image) to a human face stored in a database (e.g., from the first image). For example, the biometric module may utilize an algorithm to identify facial features by extracting landmarks, or features, from an image of a face. For example, the algorithm may analyze the relative position, size, and/or shape of the eyes, nose, cheekbones, jaw, skin color, eyes, eyelids, eye colors, ears, hair, hair color, eyebrows, nose, lips, tongue, cheek, teeth, combinations thereof, and the like. These features may then be used to search for other images with matching features. A person skilled in the art will appreciate that the aforementioned technique is merely exemplary and explanatory and is not limiting and that any appropriate facial recognition technique may be used. The biometric analysis may comprise any biometric analysis such as viseme analysis, fingerprint/hand analysis, iris scan, voice analysis, combinations thereof, and the like. Comparing the one or more objects detectable in the second image to the one or more objects in the first image may comprise comparing the initial primary virtual signature to the subsequent primary virtual signature. Comparing the one or more objects detectable in the second image to the one or more objects in the first image may comprise comparing the anonymized primary virtual signature to the subsequent anonymized primary virtual signature. The facial recognition may determine the primary object (e.g., the person) in the second image is identical to, substantially similar to, or different from the person in the first image.

At step 512 object differences may be determined. The object differences may comprise a difference between the one or more objects in the first image and the one or more objects in the second image. The one or more objects detectable in the second image may be compared to the one or more objects in the first image (e.g., "registered" or "enrolled" objects). Comparing the one or more objects detectable in the second image to the one or more objects in the first image may comprise querying a database to determine if the one or more objects in the second image are the same as, substantially similar to, or different from, the one or more registered objects. Comparing the one or more objects detectable in the second image to the one or more objects in the first image may comprise comparing the initial accessory virtual signature to the subsequent accessory virtual signature. Comparing the one or more objects detectable in the second image to the one or more objects in the first image may comprise comparing the anonymized accessory virtual signature to the subsequent anonymized accessory virtual signature.

At step 513 an updated avatar may be generated. For example, if it is determined there are differences between the one or more objects in the first image (e.g., the one or more objects in the database) and the one or more objects in the second image, the avatar and/or the avatar objects may be updated. For example, if the primary object in the first image is the same as the primary object in the second image, the avatar may remain the same. However, if there is a difference in the at least one accessory object, then one or more avatar objects may be changed. For example, if one or more accessory objects found in the first image are missing in the second image, an avatar object (e.g., the fishing pole), may disappear in from the updated avatar to correspond to the missing one or more accessory objects.

FIG. 6 shows an example method 600, executing on one or more of the devices of FIG. 1. At step 610, a primary object and one or more accessory objects may be determined. The primary object and the one or more accessory objects may be determined based on first image data. For example, an image device may capture a first image and determine the primary object and the one or more accessory objects. For example, the image device may capture the first image and send the first image to a computing device which may, in turn, determine the primary object and the one or more accessory objects. The primary object may comprise, for example, a person, an animal, a vehicle, or any other object. The primary object may be determined by performing a biometric analysis such as facial detection and recognition and generating facial recognition data. The primary object may determined by any appropriate means. For example, in the case that the primary object comprises a vehicle, object detection and recognition may be implemented to determine that the primary object comprises the vehicle, and further may be implemented to determine unique features associated with the vehicle. The one or more accessory objects may be determined by performing object detection and recognition analysis and generating accessory object data. The one or more accessory objects may comprise, for example, at least one of: a bag, a hat, an umbrella, a pair of glasses, a shoe, a wristwatch, a bracelet, a ring, a piece of jewelry, a walking cane, an earring, a piercing, a tattoo, hair, hair color, a bow, a ribbon, a collar (e.g., a dog collar), a license plate, a decal, vehicle damage, a spoiler, headlights or taillights, paint, side-view mirrors, body details or any other identifiable feature, combinations thereof, and the like. The first image data may be associated with a first location. The first image data may be associated with a first time. For example, the first image data may be captured at an entrance to a premises. The aforementioned locations are merely exemplary and explanatory and a person skilled in the art will appreciate that the first image data may be associated with any location anywhere. For example, in the case that the primary object is a vehicle, the first location may comprise a first intersection, a first toll both, a first stop sign, a first parking spot, or any other location or position anywhere in the world (e.g., a first "geolocation"). Likewise, the second location may comprise a second intersection, a second toll both, a second stop sign, a second parking spot, or any other location or position anywhere in the world (e.g., a second "geolocation").

At step 620, a first virtual signature may be determined. The first virtual signature may be determined based on audio data and the primary object. The audio data may be determined based on an audio input. The audio input may comprise, for example a spoken audio input such as a word or a phrase. The audio input may comprise environmental audio input such ambient noise or some other audio input. The audio data may comprise, for example, features of the audio input. For example, the audio data may comprise audio features such as timing, cadence, frequency, tone, or other audio information, combinations thereof, and the like. The audio data may comprise a hash of the audio input and/or the audio features. A seed function may be determined based on the hash of the audio input and/or the audio features. The first virtual signature may be determined by inputting the facial recognition data into the seed function and thereby generating the first virtual signature. The first virtual signature may be associated with the primary object.

At step 630, a second virtual signature may be determined. The second virtual signature may be determined based on the audio data and the one or more accessory objects. For example, the audio data may comprise a hash of the audio input and/or the audio features. The seed function may be determined based on the hash of the audio input and/or the audio features. The second virtual signature may be determined by inputting the accessory object data into the seed function and thereby generating the second virtual signature. The second virtual signature may be associated with the one or more accessory objects.

At step 640, an updated second virtual signature may be determined and a change in at least one accessory object may be determined. The updated second virtual signature and change in the at least one accessory object may be determined based on second image data and the first virtual signature. The second image data may comprise the primary object and the one or more accessory objects. The second image data may comprise a change in the one or more accessory objects. The change in the one or more accessory objects may comprise a change in at least one of: a physical appearance of the at least one object, or physical property of the at least one accessory object, a change in a presence of the at least one accessory object, or a change in an absence of the at least one accessory object. For example, if the first image data comprises accessory objects such as a hat, a backpack, an umbrella, and a pair of gloves, the second image data may comprise the hat, the backpack, and a single glove. That is to say, the umbrella and one glove may be absent from the second image data and thus comprise a change in the one or more accessory objects. Similarly, the change in the one or more accessory objects may comprise a change in a physical appearance and/or physical property of the one or more accessory objects. For example, in the case that the primary object is a vehicle comprising one or more accessory objects such as a green rear spoiler and an absence of damage to the vehicle, the change in the one or more accessory objects may comprise in color of the rear spoiler (e.g., from green to red) and the appearance of a large scratch down the side of the vehicle. Determining the updated second virtual signature may comprise performing object detection and recognition on the second image data to generated updated accessory object data and determining a difference in the one or more accessory objects. The updated accessory object data may be inputted into the seed function and thereby generate the updated second signature. Step 640 may also comprise determining (e.g., redetermining, confirming) the first virtual signature. Determining the first virtual signature may comprise confirming the first virtual signature at a point in time after the first virtual signature was initially determined. For example, by performing the biometric analysis on the primary object in the second image, it may be confirmed that the primary object in the second image data is the same primary object in the first image data. Determining the updated second virtual signature and the change in the at least one accessory object may comprise sending a query comprising the first virtual signature. Determining the updated second virtual signature and the change in the at least one accessory object may comprise determining, based on the query, the first virtual signature is associated with the second virtual signature. Determining the updated second virtual signature and the change in the at least one accessory object may comprise determining, based on a comparison of the one or more accessory objects in the first image data with a second one or more accessory objects in the second image data, the change in the at least one accessory object. Determining the updated second virtual signature and the change in the at least one accessory object may comprise generating, based on the change in the at least one accessory object, the updated second virtual signature.

At step 650, a state of the primary object may be determined. The state of the primary object may comprise an indication that the primary object has not changed but that at least one accessory object of the one or more accessory objects has changed. For example, the state of the primary object may indicate a change in an appearance of either or both of the primary object and at least one accessory object of the one or more accessory objects. The change in the appearance of either or both of the primary object and the at least one accessory object of the one or more accessory objects may be associated with a threshold. For example, the threshold may comprise: 0%-10% missing/changed=no alert. From 11%-25% missing/changed=low alert (display icons of missing/changed objects). From 26%-50% missing/changed=warning (display icons of missing/changed objects). Above 50%=Alarm (too many objects changed) missing/undetectable object (silhouette icon). The threshold may be adjusted up or down based on, for example, the nature of the change in the appearance of the primary object and/or the at least one accessory object of the one or more accessory objects. Based on a determined change satisfying or failing to satisfy the threshold, an alarm signal may be sent to an application and/or system such as a security system. For example, the alarm signal may be configured to cause an alert to be displayed on a screen or sent in a message. As one of skill in the art will appreciate, the alarm signal may be sent via wired or wireless network.

At step 660, output of the state of the primary object may be caused. Causing output of the state of the primary object may comprise sending a message. For example, the message may comprise an accessory object alert indicating that at least on accessory object of the one or more accessory objects has changed.

The method may further comprise converting the first virtual signature into a first avatar. For example, converting the first virtual signature into the first avatar may comprise converting, based on a hash of the audio data, the first virtual signature into the first avatar. The method may further comprise displaying, via a display device, the first avatar. The method may further comprise determining, based on the second image data, a change in a location of the primary object and/or the one or more accessory objects. The method may further comprise causing, via the display device, a corresponding change in a location of the first avatar. The method may further comprise displaying the change in the location of the first avatar. The method may further comprise comparing a status of an object time to a live timer and/or counter so as to determine if the live timer has expired or if the object is still present and any object data and avatar identifiable PII should be deleted.

FIG. 7 shows an example method 700, executing on one or more of the devices of FIG. 1. At step 710, an avatar may be determined. The avatar may be determined based on the audio data and the image data comprising the primary object and the one or more accessory objects. For example, an image device may capture a first image and determine the primary object and the one or more accessory objects. For example, the image device may capture the first image and send the first image to a computing device which may, in turn, determine the primary object and the one or more accessory objects. The primary object may comprise, for example, a person, an animal, a vehicle, or any other object. The primary object may be determined by performing a biometric analysis such as facial detection and recognition and generating facial recognition data. The one or more accessory objects may be determined by performing object detection and recognition analysis and generating accessory object data. The one or more accessory objects may comprise, for example, at least one of: a bag, a hat, an umbrella, a pair of glasses, a shoe, a wristwatch, a bracelet, a ring, a piece of jewelry, a walking cane, an earring, a piercing, a tattoo, hair, hair color, a bow, a ribbon, a collar (e.g., a dog collar), a license plate, a decal, combinations thereof, and the like. The first image data may be associated with a first location. The first image data may be associated with a first time. For example, the first image data may be captured at an entrance to a premises.

The avatar may be determined based on audio data and the primary object. The audio data may be determined based on an audio input. The avatar may be determined based on the one or more accessory objects. The audio input may comprise, for example a spoken audio input such as a word or a phrase. The audio input may comprise environmental audio input such ambient noise or some other audio input. The audio data may comprise, for example, features of the audio input. For example, the audio data may comprise audio features timing, cadence, frequency, tone, and other audio information. The audio data may comprise a hash of the audio input and/or the audio features. The seed function may be determined based on the hash of the audio input and/or the audio features. The avatar may be determined by inputting the facial recognition data into the seed function and based on the result, randomly generating and/or selecting the avatar. The avatar may be associated with the primary object.

At step 720, a change in at least one accessory object of the one or more accessory objects may be determined. The change in the at least one accessory object may comprise a change in at least one of: a physical appearance of the at least one object, or physical property of the at least one accessory object, a change in a presence of the at least one accessory object, or a change in an absence of the at least one accessory object. For example, if the first image data comprises accessory objects such as a hat, a backpack, an umbrella, and a pair of gloves, the second image data may comprise the hat, the backpack, and a single glove. That is to say, the umbrella and one glove may be absent from the second image data and thus comprise a change in the one or more accessory objects. Similarly, the change in the one or more accessory objects may comprise a change in a physical appearance and/or physical property of the one or more accessory objects. For example, in the case that the primary object is a vehicle comprising one or more accessory objects such as a green rear spoiler and an absence of damage to the vehicle, the change in the one or more accessory objects may comprise in color of the rear spoiler (e.g., from green to red) and the appearance of a large scratch down the side of the vehicle. The change in the at least one accessory object of the one or more accessory objects may be determined based on second image data. The second image data may comprise the primary object and the one or more accessory objects. The second image data may be determined after a period of time. For example, the period of time may comprise one or more units of time after the first image data is collected. For example, the second image data may be collected upon a change of location, upon a request, and/or the passing of time. The second image data may be captured periodically. The second image data may comprise a change in at least one accessory object of the one or more accessory objects. For example, if the first image data comprises the primary object with a hat, a backpack, an umbrella, and a pair of gloves, the second image data may comprise the primary object, the hat, the backpack, and a single glove. That is to say, the umbrella and one glove may be absent from the second image data. Determining the change in the at least one accessory object of the one or more accessory objects may comprise performing object detection and recognition on the second image data to generate updated accessory object data and determine the difference in the one or more accessory objects. The change in the at least one accessory object of the one or more accessory objects may be associated with a threshold. For example, the threshold may comprise: 0%-10% missing/changed=no alert. From 11%-25% missing/changed=low alert (display icons of missing/changed objects). From 26%-50% missing/changed=warning (display icons of missing/changed objects). Above 50%=Alarm (too many objects changed)

missing/undetectable object (silhouette icon). The threshold may be adjusted up or down based on, for example, what percent change is observed in the at least one accessory object of the one or more accessory objects. Based on a determined change in the at least one accessory object of the one or more accessory objects satisfying or failing to satisfy the threshold, an alarm signal may be sent to an application and/or system such as a security system. For example, the alarm signal may be configured to cause an alert to be displayed on a screen or sent in a message. As one of skill in the art will appreciate, the alarm signal may be sent via wired or wireless network.

At step 730, the avatar may be updated. Updating the avatar may comprise changing a feature of one or more features associated with the avatar. The change in the feature of the one or more features associated with the avatar may correspond to a change in the at least on accessory object of the one or more accessory objects. For example, the avatar is wearing a backpack at a first point in time and at a first location, the avatar may be caused to no wearing the backpack at a second time and may instead hold a fishing pole.

At step 740, the updated avatar may be output. For example, outputting the updated avatar may comprise sending a message. For example, outputting the updated avatar may comprise causing the updated avatar to be displayed on a display device such as a monitor and/or a mobile device.

The method may further comprise displaying the avatar and/or the updated avatar. Displaying the avatar may comprise displaying the avatar on a display device. For example, displaying the avatar may comprise displaying the avatar on the screen of a computer, a television, a phone, combinations thereof, and the like.

The method may further comprise triggering an alarm. The alarm may be triggered based on determining the change in the at least one accessory object of the one or more accessory objects. For example, if the change satisfies a threshold, an alarm may be generated. The alarm may be configured to cause any action. For example, the alarm may cause an audible alarm to sound through a speaker, the alarm may cause the engine of a vehicle to shut off, the alarm may cause the doors of the premises to lock, the alarm may cause security personnel to be alerted (e.g., airport security, museum security, prison guards, etc.). The aforementioned are merely exemplary and explanatory and are not intended to be limiting. A person skilled in the art will appreciate that any action may be caused based on the alarm. For example, based on the determined change in at least one accessory object of the one or more accessory objects satisfying or failing to satisfy a threshold, an alarm signal may be sent to an application and/or system such as a security system. For example, the alarm signal may be configured to cause an alert to be displayed on a screen or sent in a message. As one of skill in the art will appreciate, the alarm signal may be sent via wired or wireless network.

FIG. 8 shows an example method 800, executing on one or more of the devices of FIG. 1. At step 810, an avatar may be determined. The avatar may be determined based on the audio data and the image data comprising the primary object and the one or more accessory objects. For example, an image device may capture a first image and determine the primary object and the one or more accessory objects. For example, the image device may capture the first image and send the first image to a computing device which may, in turn, determine the primary object and the one or more accessory objects. The primary object may comprise, for example, a person, an animal, a vehicle, or any other object. The primary object may be determined by performing a biometric analysis such as facial detection and recognition and generating facial recognition data. The one or more accessory objects may be determined by performing object detection and recognition analysis and generating accessory object data. The one or more accessory objects may comprise, for example, at least one of: a bag, a hat, an umbrella, a pair of glasses, a shoe, a wristwatch, a bracelet, a ring, a piece of jewelry, a walking cane, an earring, a piercing, a tattoo, hair, hair color, a bow, a ribbon, a collar (e.g., a dog collar), a license plate, a decal, combinations thereof, and the like. The first image data may be associated with a first location. The first image data may be associated with a first time. For example, the first image data may be captured at an entrance to a premises.

The avatar may be determined based on audio data and the primary object. The audio data may be determined based on an audio input. The audio input may comprise, for example a spoken audio input such as a word or a phrase. The audio input may comprise environmental audio input such ambient noise or some other audio input. The audio data may comprise, for example, features of the audio input. For example, the audio data may comprise audio features timing, cadence, frequency, tone, and other audio information. The audio data may comprise a hash of the audio input and/or the audio features. The seed function may be determined based on the hash of the audio input and/or the audio features. The avatar may be determined by inputting the facial recognition data into the seed function and based on the result, randomly generating and/or selecting the avatar. The avatar may be associated with the primary object.

At step 820, a change in at least one accessory object of the one or more accessory objects may be determined. The change in the at least one accessory object of the one or more accessory objects may be determined based on second image data. The second image data may comprise the primary object and the one or more accessory objects. The second image data may comprise a change in at least one accessory object of the one or more accessory objects. The change in the one or more accessory objects may comprise a change in at least one of: a physical appearance of the at least one object, or physical property of the at least one accessory object, a change in a presence of the at least one accessory object, or a change in an absence of the at least one accessory object. For example, if the first image data comprises accessory objects such as a hat, a backpack, an umbrella, and a pair of gloves, the second image data may comprise the hat, the backpack, and a single glove. That is to say, the umbrella and one glove may be absent from the second image data and thus comprise a change in the one or more accessory objects. Similarly, the change in the one or more accessory objects may comprise a change in a physical appearance and/or physical property of the one or more accessory objects. For example, in the case that the primary object is a vehicle comprising one or more accessory objects such as a green rear spoiler and an absence of damage to the vehicle, the change in the one or more accessory objects may comprise in color of the rear spoiler (e.g., from green to red) and the appearance of a large scratch down the side of the vehicle.

At step 830, an identity probability associated with the primary object may be determined. The identity probability associated with the primary object may be determined based on the audio data and the change in the at least one accessory object of the one or more accessory objects. In determining the identity probability, a similarity between the primary object in the first image data and the primary object in the second image data may be determined. For example, facial detection and recognition analysis may be performed and the primary object in the first image data and the primary object in the second image data may be compared. The comparison of the primary object in the first image data and the primary object in the second image data may yield a primary object comparison score.

Likewise, the one or more accessory objects in the first image data and the one or more accessory objects in the second image data may be compared. The comparison of the one or more accessory objects in the first image data and the one or more accessory objects in the second image data may yield an accessory object comparison score. The primary object comparison score and the accessory object comparison score may indicate the identity probability.

At step 840, the identity probability may be output. For example, outputting the identity probability may comprise sending a message. For example, outputting the identity probability may comprise causing an identity probability indicator to be displayed. For example, the identity probability indicator may comprise a number, a bar, a graph, or the like. For example, the number may comprise an indication of how similar the primary object in the first image data is to the primary object in the second image data. Likewise, the number may comprise an indication of how similar the one or more accessory objects in the first image data are to the one or more accessory objects in the second image data. The bar may comprise a color indicator. For example, if the facial detection and recognition analysis indicates the primary object in the second image data is 99% similar to the primary object in the first image data, the bar may be green, indicating primary object in the second image data is most likely the primary object in the second image data. However, if the facial detection and recognition analysis indicates the primary object in the second image data is only 50% similar to the primary object in the first image data, the bar may be yellow, indicating the primary object in the second image data may not be the same as the primary object in the first image data. The outputs may vary based on difference and/or similarity. For example, if the facial detection and recognition analysis indicates the primary object in the second image data is only 5% similar to the primary object in the first image data, an alarm may be triggered. The alarm may comprise a flash of the similarity or an audible alarm, combinations thereof, and the like. If the facial detection and recognition analysis indicates the primary object in the second image data is low (e.g., only 5% similar to the primary object in the first image data), a rescan may be triggered. For example, based on the change in at least one accessory object of the one or more accessory objects satisfying or failing to satisfy a threshold and/or the identity probability satisfying or failing to satisfy a threshold, an alarm signal may be sent to an application and/or system such as a security system. For example, the alarm signal may be configured to cause an alert to be displayed on a screen or sent in a message. As one of skill in the art will appreciate, the alarm signal may be sent via wired or wireless network.

Figure 9:
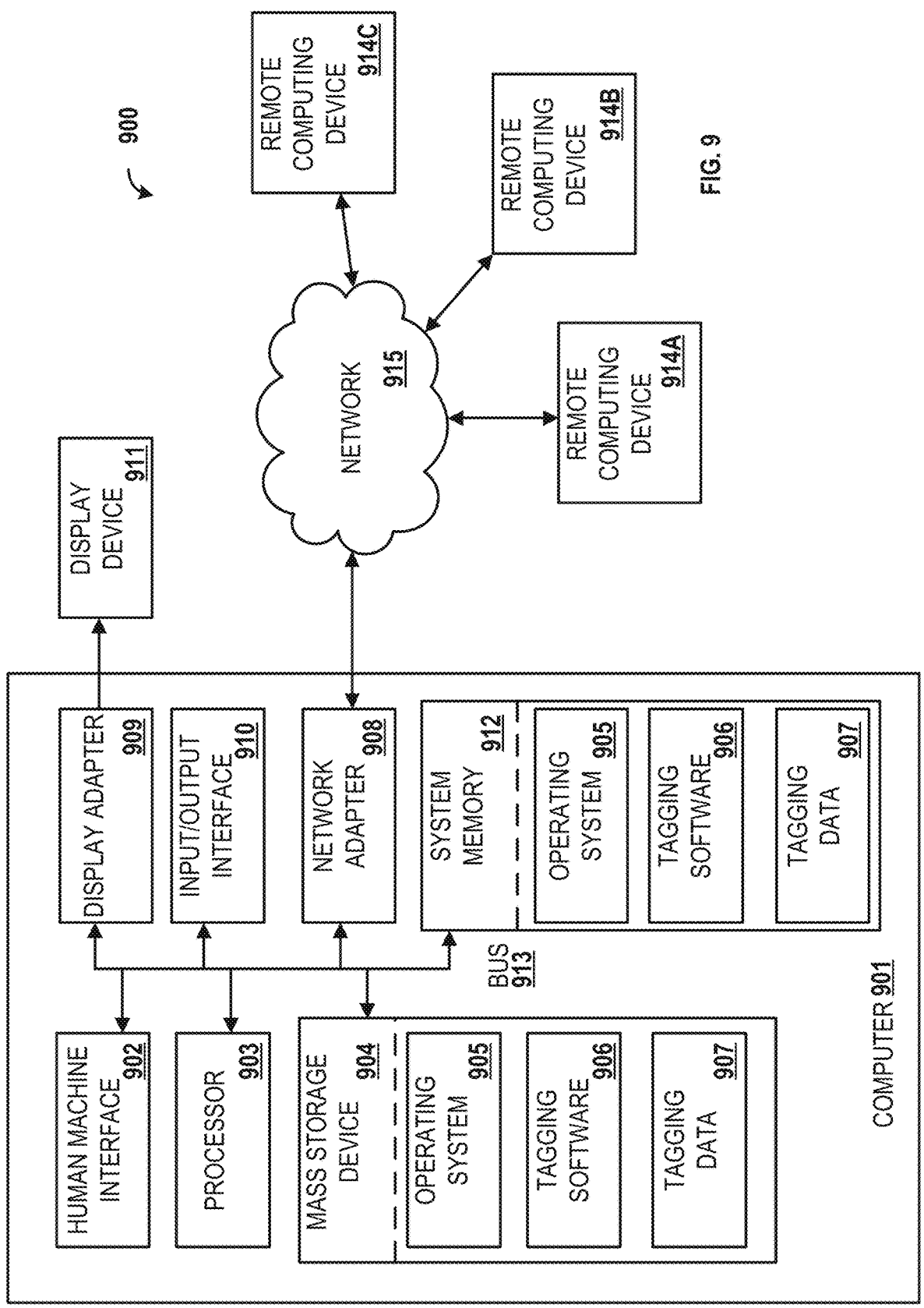
FIG. 9 is a block diagram of an example computing device and system.

The above described disclosure may be implemented on a computer 901 as illustrated in FIG. 9 and described below. By way of example, the computing device 106 of FIG. 1 can be a computer as illustrated in FIG. 9. Similarly, user device 102 and storage 112 may be a computer as illustrated in FIG. 9. Likewise, the computing device 106, the user device 102, or the storage 112 may be a remote computing device (e.g., remote computing devices 914A, 914B, or 914C) of FIG. 9. FIG. 9 is a block diagram illustrating an example operating environment for performing the disclosed methods. This example operating environment is only an example of an operating environment and is not intended to suggest any limitation as to the scope of use or functionality of operating environment architecture. Neither should the operating environment be interpreted as having any dependency or requirement relating to any one or combination of components illustrated in the example operating environment.

The present disclosure can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Examples comprise set top boxes, programmable consumer electronics, network PCs, minicomputers, mainframe computers, distributed computing environments that comprise any of the above systems or devices, and the like.

The processing of the disclosed can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 901. The components of the computer 901 can comprise, but are not limited to, one or more processors 903, a system memory 912, and a system bus 913 that couples various system components including the one or more processors 903 to the system memory 912. The system can utilize parallel computing.

The system bus 913 represents one or more of several possible types of bus structures, including a memory bus or memory controller, a peripheral bus, an accelerated graphics port, or local bus using any of a variety of bus architectures. By way of example, such architectures can comprise a Peripheral Component Interconnects (PCI), a PCI-Express bus, Universal Serial Bus (USB), hypertransport and other current high speed motherboard buses, and the like. The bus 913, and all buses specified in this description can also be implemented over a wired or wireless network connection and each of the subsystems, including the one or more processors 903, a mass storage device 904, an operating system 905, tagging software 906, tagging data 907, a network adapter 908, the system memory 912, an Input/Output Interface 910, a display adapter 909, a display device 911, and a human machine interface 902, can be contained within one or more remote computing devices 914A, 914B, 914C at physically separate locations, connected through buses of this form, in effect implementing a fully distributed system.

The computer 901 typically comprises a variety of computer readable media.

Example readable media can be any available media that is accessible by the computer 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data such as the tagging data 907 and/or program modules such as the operating system 905 and the tagging software 906 that are immediately accessible to and/or are presently operated on by the one or more processors 903.

The computer 901 can also comprise other removable/non-removable, volatile/non-volatile computer storage media. By way of example, FIG. 9 illustrates the mass storage device 904 which can facilitate non-volatile storage of computer code, computer readable instructions, data structures, program modules, and other data for the computer 901. For example and not meant to be limiting, the mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, the operating system 905 and the tagging software 906. Each of the operating system 905 and the tagging software 906 (or some combination thereof) can comprise elements of the programming and the tagging software 906. The tagging data 907 can also be stored on the mass storage device 904. The tagging data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

The user or device can enter commands and information into the computer 901 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 903 via the human machine interface 902 that is coupled to the system bus 913, but can be connected by other interface and bus structures, such as a parallel port, game port, an IEEE 1394 Port (also known as a Firewire port), a serial port, or a universal serial bus (USB), a wireless peripheral connection such as, for example, Bluetooth, WiFi, and/or Ultra-wideband (UWB).

The display device 911 can also be connected to the system bus 913 via an interface, such as the display adapter 909. It is contemplated that the computer 901 can have more than one display adapter 909 and the computer 901 can have more than one display device 911. For example, the display device 911 can be a monitor, an LCD (Liquid Crystal Display), or a projector. In addition to the display device 911, other output peripheral devices can comprise components such as speakers (not shown) and a printer (not shown) which can be connected to the computer 901 via the Input/Output Interface 910. Any step and/or result of the methods can be output in any form to an output device. Such output can be any form of visual representation, including, but not limited to, textual, graphical, animation, audio, tactile, and the like. The display device 911 and computer 901 can be part of one device, or separate devices.

The computer 901 can operate in a networked environment using logical connections to one or more remote computing devices 914A, 914B, 914C. By way of example, a remote computing device can be a personal computer, portable computer, smartphone, a server, a router, a network computer, a peer device or other common network node, and so on. Logical connections between the computer 901 and a remote computing device 914A, 914B, 914C can be made via a network 915, such as a local area network (LAN) and/or a general wide area network (WAN). Such network connections can be through the network adapter 908. The network adapter 908 can be implemented in both wired and wireless environments. Such networking environments are conventional and commonplace in dwellings, offices, enterprise-wide computer networks, intranets, and the Internet.

For purposes of illustration, application programs and other executable program components such as the operating system 905 are illustrated herein as discrete blocks, although it is recognized that such programs and components reside at various times in different storage components of the computing device 901, and are executed by the one or more processors 903 of the computer. An implementation of the selective tagging software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The disclosure can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the disclosure has been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow;

plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as an example only, with a true scope and spirit being indicated by the following claims.

What is claimed is:

1. A method comprising:
   determining, by a computing device, based on first image data, a primary object and one or more accessory objects;
   generating, by the computing device, based on a seed function associated with audio data and the primary object, a first virtual signature;
   generating, by the computing device, based on the audio data and the one or more accessory objects, a second virtual signature;
   determining, by the computing device, based on second image data comprising the primary object, and the first virtual signature, a change in at least one accessory object of the one or more accessory objects;
   generating, by the computing device, based on the change in the at least one accessory object, an updated second virtual signature;
   determining, by the computing device, based on a difference between the second virtual signature and the updated second virtual signature, a state of the primary object; and
   causing, by the computing device, output of the state of the primary object.

2. The method of claim 1, wherein the first image data is associated with a first location and first timing information and wherein the second image data is associated with a second location and second timing information.

3. The method of claim 1, wherein determining the primary object and the one or more accessory objects comprises receiving the first image data from an image capture device, and wherein the primary object comprises at least one of: a person, an animal, or a vehicle and wherein the one or more accessory objects comprise at least one of: a bag, a hat, an umbrella, a pair of glasses, a shoe, a wristwatch, a bracelet, a ring, a piece of jewelry, a walking cane, an earring, a piercing, a tattoo, hair, hair color, a bow, a ribbon, a collar, a dog collar, a license plate, a decal, vehicle damage, a spoiler, headlights or taillights, paint, side-view mirrors, or body details.

4. The method of claim 1, wherein determining, based on the first image data, the primary object and the one or more accessory objects comprises:
   performing facial recognition to determine the primary object; and
   performing object detection and recognition to determine the one or more accessory objects.

5. The method of claim 1, wherein generating the first virtual signature comprises inputting facial recognition data into the seed function.

6. The method of claim 1, wherein the seed function comprises an audio-based hash function.

7. The method of claim 1, wherein the change in the at least one accessory object of the one or more accessory objects comprises a change in at least one of: a physical appearance of the at least one accessory object, a change in a physical property of the at least one accessory object, a change in a presence of the at least one accessory object, or a change in an absence of the at least one accessory object.

8. The method of claim 1, wherein the second image data comprises a second one or more accessory objects.

9. The method of claim 8, wherein generating the updated second virtual signature comprises:
   sending a query comprising the first virtual signature;
   determining, based on the query, the first virtual signature is associated with the second virtual signature;
   determining, based on a comparison of the one or more accessory objects in the first image data with the second one or more accessory objects in the second image data, the change in the at least one accessory object; and
   generating, based on the change in the at least one accessory object, the updated second virtual signature.

10. The method of claim 1, further comprising:
    converting, based on a hash of the audio data, the first virtual signature into a first avatar; and
    displaying, via a display device, the first avatar.

11. The method of claim 10, further comprising:
    determining, based on the second image data, a change in a location of the primary object; and
    displaying, via the display device, a corresponding change in a location of the first avatar.

12. The method of claim 1, wherein at least one of: the first virtual signature, the second virtual signature, the updated second virtual signature, the one or more accessory objects, the audio data, the first image data, or the second image data are deleted after at least one of a specified interval or upon conclusion of a determination that the primary object is present.

13. A method comprising:
    generating, by a computing device, based on a seed function associated with audio data and first image data comprising a primary object and one or more accessory objects, an avatar;
    determining, by the computing device, based on second image data comprising the primary object, a change in at least one accessory object of the one or more accessory objects;
    updating, by the computing device, based on the seed function associated with the audio data and the change in the at least one accessory object, the avatar; and
    causing, by the computing device, output of the updated avatar.

14. The method of claim 13, wherein the first image data is associated with a first location and wherein the second image data is associated with a second location.

15. The method of claim 13, wherein the primary object comprises at least one of: a person, an animal, or a vehicle, and wherein the one or more accessory objects comprise at least one of: a bag, a hat, an umbrella, a pair of glasses, a shoe, a wristwatch, a bracelet, a ring, a piece of jewelry, a walking cane, an earring, a piercing, a tattoo, hair, hair color, a bow, a ribbon, vehicle damage, a front spoiler, a rear spoiler, an antenna, headlights, taillights, side-view mirrors, decals, a quick-read (QR) code, a sticker, a license plate, one or more wheels, one or more tires, an exhaust pipe, or window tinting.

16. The method of claim 13, further comprising outputting the avatar.

17. The method of claim 13, wherein the seed function comprises at least one of a random number generator or a pseudorandom number generator.

18. The method of claim 13, wherein updating the avatar comprises changing one or more avatar accessory objects associated with the avatar.

19. The method of claim 13, wherein causing output of the updated avatar comprises displaying the avatar via a display device.

20. The method of claim 13, wherein the avatar, the one or more accessory objects, the audio data, the first image data, and the second image data are deleted after at least one of: a specified interval or upon conclusion of a determination that the primary object is present.

21. The method of claim 13, wherein determining the change in the at least one accessory object comprises determining at least one of: a change in a physical appearance of the at least one accessory object, a change in a physical property of the at least one accessory object, a change in a presence of the at least one accessory object, or a change in an absence of the at least one accessory object.

22. A method comprising:
generating, by a computing device, based on a seed function associated with audio data, and first image data comprising a primary object and one or more accessory objects, an avatar;
determining, by the computing device, based on second image data comprising the primary object, a change in at least one accessory object of the one or more accessory objects;
determining, by the computing device, based on the audio data and the change in the at least one accessory object, an identity probability associated with the primary object; and
causing, by the computing device, output of the identity probability.

23. The method of claim 22, wherein the first image data comprises an image of a person and wherein the primary object comprises at least one of: a person, an animal, or a vehicle, and wherein the one or more accessory objects comprise at least one of: a bag, a hat, an umbrella, a pair of glasses, a shoe, a wristwatch, a bracelet, a ring, a piece of jewelry, a walking cane, an earring, a piercing, a tattoo, hair, hair color, a bow, a ribbon, vehicle damage, a front spoiler, a rear spoiler, an antenna, headlights, taillights, side-view mirrors, decals, a quick-read (QR) code, a sticker, a license plate, one or more wheels, one or more tires, an exhaust pipe, or window tinting.

24. The method of claim 22, wherein the first image data is associated with a first location and wherein the second image data is associated with a second location.

25. The method of claim 22, further comprising outputting the avatar.

26. The method of claim 22, wherein the change in the at least one accessory object comprises: a change in a physical appearance of at least one object, a change in a physical property of the at least one accessory object, a change in a presence of the at least one accessory object, or a change in an absence of the at least one accessory object.

27. The method of claim 22, further comprising displaying, via a display device, an indicator associated with the identity probability.

28. The method of claim 22, wherein the identity probability comprises an identity probability associated a person.

29. The method of claim 22, wherein the identity probability of the primary object, the at least one accessory object, audio data, and image data are deleted after at least one of: a specified interval, or upon conclusion of the primary object being present.

30. A method comprising:
determining, by a computing device, based on first image data, primary object data and accessory object data;
generating, by the computing device, based on a seed function associated with hash of audio data and the primary object data, a first virtual signature;
generating, by the computing device, based on a hash of the audio data and the accessory object data, a second virtual signature;
generating, by the computing device, based on second image data comprising a change in the accessory object data, and the hash of the audio data, an updated second virtual signature;
determining, by the computing device, based on a difference between the second virtual signature and the updated second virtual signature, an object state associated with the primary object data; and
causing, by the computing device, output of the object state.

31. The method of claim 30, wherein the first image data is associated with a first location and wherein the second image data is associated with a second location.

32. The method of claim 30, further comprising storing the first virtual signature.

33. The method of claim 30, wherein determining the primary object data and the accessory object data comprises:
performing facial recognition to determine the primary object data; and
performing object detection determine the accessory object data.

34. The method of claim 30, further comprising:
converting, based on the hash of the audio data, the first virtual signature into a first avatar; and
displaying, via a display device, the first avatar.

35. The method of claim 32, further comprising:
determining, based on the second image data, a change in a location of the primary object data; and
displaying, via a display device, a corresponding change in a location of a first avatar.

36. The method of claim 30, wherein the object state and accessory object audio data and image data is deleted after at least one of a specified interval and upon conclusion of the primary object data being present.

37. The method of claim 30, further comprising, sending, based on the object state, an alarm signal.

* * * * *